(12) United States Patent
Wakamatsu

(10) Patent No.: US 9,990,169 B2
(45) Date of Patent: Jun. 5, 2018

(54) PRINT CONTROLLER, PRINT CONTROL METHOD AND NON-TRANSITORY COMPUTER READABLE RECORDING MEDIUM FOR EXECUTING TEST PRINT

(71) Applicant: FUJI XEROX CO., LTD., Tokyo (JP)

(72) Inventor: Jun Wakamatsu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days. days.

(21) Appl. No.: 15/340,230

(22) Filed: Nov. 1, 2016

(65) Prior Publication Data
US 2017/0337023 A1    Nov. 23, 2017

(30) Foreign Application Priority Data

May 23, 2016  (JP) .................................. 2016-102505
May 30, 2016  (JP) .................................. 2016-106893

(51) Int. Cl.
   *G06F 3/12*    (2006.01)
(52) U.S. Cl.
   CPC .......... *G06F 3/1297* (2013.01); *G06F 3/1206* (2013.01); *G06F 3/1208* (2013.01); *G06F 3/1243* (2013.01); *G06F 3/1251* (2013.01); *G06F 3/1252* (2013.01); *G06F 3/1256* (2013.01); *G06F 3/1267* (2013.01); *G06F 3/1275* (2013.01)
(58) Field of Classification Search
   None
   See application file for complete search history.

(56) References Cited

U.S. PATENT DOCUMENTS

| 2002/0051169 | A1 | 5/2002 | Nishikawa |
| 2002/0171868 | A1 | 11/2002 | Yoshimura et al. |
| 2007/0165248 | A1* | 7/2007 | Utsunomiya ......... G06F 3/1208 358/1.1 |
| 2007/0188791 | A1 | 8/2007 | Utsunomiya et al. |
| 2010/0073706 | A1* | 3/2010 | Chan ..................... G06F 3/1205 358/1.15 |
| 2010/0238498 | A1 | 9/2010 | Okada et al. |
| 2012/0113462 | A1 | 5/2012 | Mihira |

FOREIGN PATENT DOCUMENTS

| JP | 2004-295680 A | 10/2004 |
| JP | 2005-092586 A | 4/2005 |
| JP | 2005-190208 A | 7/2005 |

OTHER PUBLICATIONS

Feb. 16, 2018 Office Action issued in Australian Patent Application No. 2016259398.

* cited by examiner

*Primary Examiner* — Thomas D Lee
(74) *Attorney, Agent, or Firm* — Oliff PLC

(57) ABSTRACT

Provided is a print controller connectable to each of a cut paper printer and a continuous paper printer, the print controller including a receiving unit that receives a print job in a job ticket format from a print work flow system, a test print instruction unit that generates a print job of a new test print based on the print job and instructs the cut paper printer to execute a print process to execute a test print using print data included in the print job, a holding notification unit that notifies the print work flow system of an effect that the print job is held, and a real print job instruction unit that sends the print data included in the print job and a print parameter to the continuous paper printer and instructs the continuous paper printer to execute a real print job.

18 Claims, 21 Drawing Sheets

FIG.13

| SETTING ITEM 1310 | CONTENTS 1320 | 1300 |
|---|---|---|
| SCALING | DO NOT | |
| RIP TYPE | CPSI | |
| COPY NUMBER | 1000 | |
| PAPER FEEDING | STOCK | |
| SHEET TYPE | SHEET A | |
| SETTING OF OUTPUT DESTINATION | PRINT | |
| GIVE PRIORITY TO CONTINUOUS PRINT | DO NOT | |
| GIVE PRIORITY TO DESIGNATION IN FILE | DO NOT | |
| COLOR GAMUT | | |
| COLOR TONE | | |

FIG.15

Sample print has been completed on the printer.
Please check the changed print parameter.
Please push the approval button for execution of real print.
The real print will start if you push the approval button.

| SETTING ITEM | CONTENTS | CHANGE | COST VARIATION |
|---|---|---|---|
| SCALING | DO NOT | | |
| RIP TYPE | CPSI | | ● |
| COPY NUMBER | 1000 | | ● |
| PAPER FEEDING | STOCK | | |
| SHEET TYPE | SHEET A | ✓ | |
| SETTING OF OUTPUT DESTINATION | PRINT | | |
| GIVE PRIORITY TO CONTINUOUS PRINT | DO NOT | | |
| GIVE PRIORITY TO DESIGNATION IN FILE | DO NOT | | |
| COLOR GAMUT | | | |
| COLOR TONE | | | |

APPROVER AFFILIATION
APPROVER NAME

APPROVAL   CANCEL

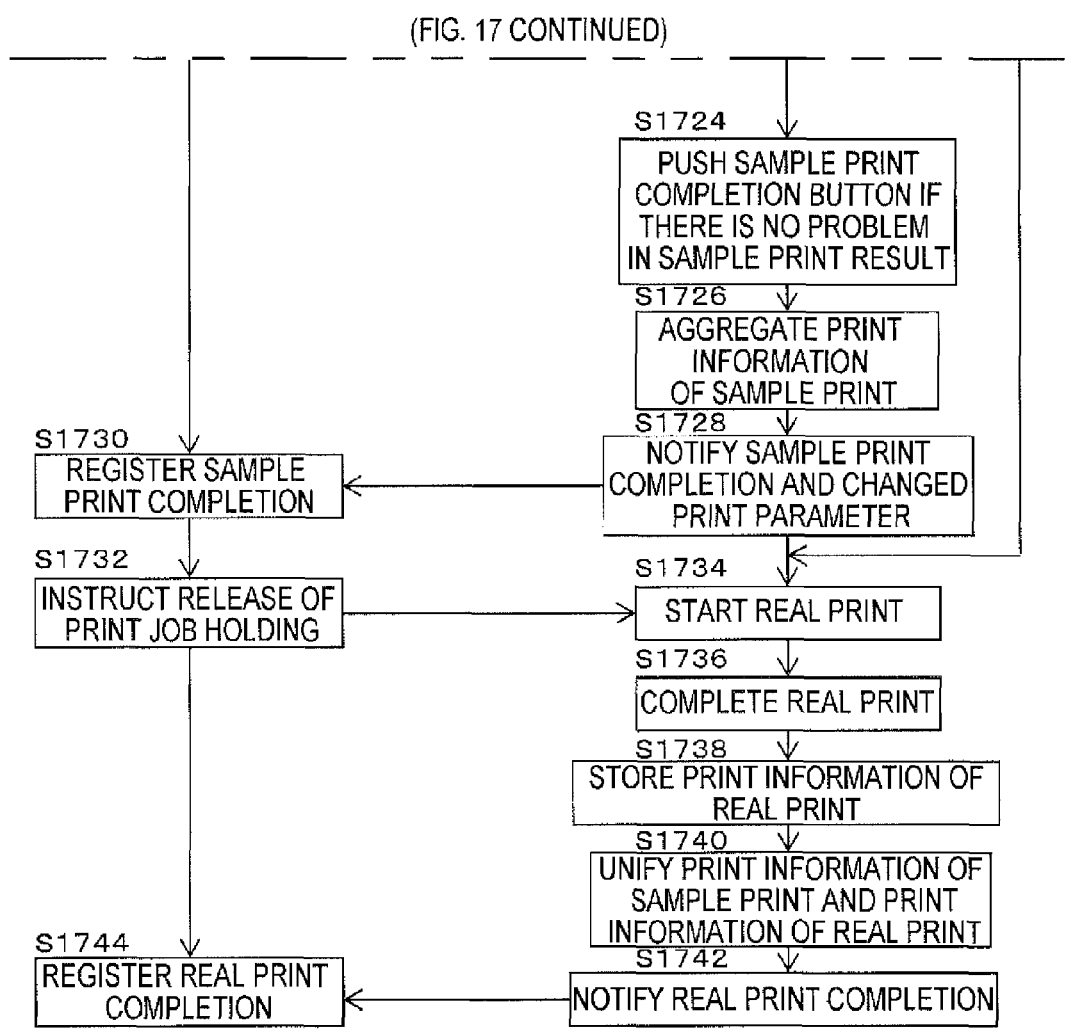

FIG.18A

| JOB ID | PRINTING DEVICE TYPE | SHEET SIZE | SAMPLE PRINT | SCRAP SHEET | REAL PRINT | SUM |
|---|---|---|---|---|---|---|
| 1 | PRINTING DEVICE A | A4 | 21 | 12 | 0 | 33 |

FIG.18B

| JOB ID | PRINTING DEVICE TYPE | SHEET SIZE | SAMPLE PRINT | SCRAP SHEET | REAL PRINT | SUM |
|---|---|---|---|---|---|---|
| 1 | PRINTING DEVICE B | A4 | 0 | 20 | 432 | 452 |

FIG.18C

| JOB ID | PRINTING DEVICE TYPE | SHEET SIZE | SAMPLE PRINT | SCRAP SHEET | REAL PRINT | SUM |
|---|---|---|---|---|---|---|
| 1 | PRINTING DEVICE A | A4 | 21 | 12 | 0 | 33 |
| 1 | PRINTING DEVICE B | A4 | 0 | 20 | 432 | 452 |

PRINT CONTROLLER, PRINT CONTROL METHOD AND NON-TRANSITORY COMPUTER READABLE RECORDING MEDIUM FOR EXECUTING TEST PRINT

CROSS-REFERENCE TO RELATED APPLICATIONS

This application is based on and claims priority under 35 USC 119 from Japanese Patent Application Nos. 2016-102505 filed May 23, 2016 and 2016-106893 filed May 30, 2016.

BACKGROUND

Technical Field

The present invention relates to a print controller, a print control method and a non-transitory computer readable recording medium.

SUMMARY

According to an aspect of the invention, there is provided a print controller connectable to each of a cut paper printer and a continuous paper printer, the print controller including:

a receiving unit that receives a print job in a job ticket format from a print work flow system;

a test print instruction unit that generates a print job of a new test print based on the print job received by the receiving unit and instructs the cut paper printer to execute a print process so as to execute a test print using print data included in the print job when, as a result of interpretation of the print job, the print job includes an effect requiring that the print process according to the print job be executed with the continuous paper printer and an effect requiring that the test print according to the print job be executed;

a holding notification unit that notifies the print work flow system of an effect that the print job is held when the print job of the test print is generated; and a real print job instruction unit that, upon receiving from the print work flow system or an operator an instruction of an effect that the holding of the print job is released, sends the print data included in the print job and a print parameter changed according to an image quality parameter changed in the print job of the test print to the continuous paper printer and instructs the continuous paper printer to execute a real print job.

BRIEF DESCRIPTION OF THE DRAWINGS

Exemplary embodiments of the present invention will be described in detail based on the following figures, wherein:

FIG. 13 is an explanatory view illustrating an example of a data structure of a print parameter table;

FIG. 15 is an explanatory view illustrating an example of display of a print parameter change check screen;

FIGS. 18A to 18C are explanatory views illustrating an example of a data structure of a print information table.

DETAILED DESCRIPTION

Figure 1:
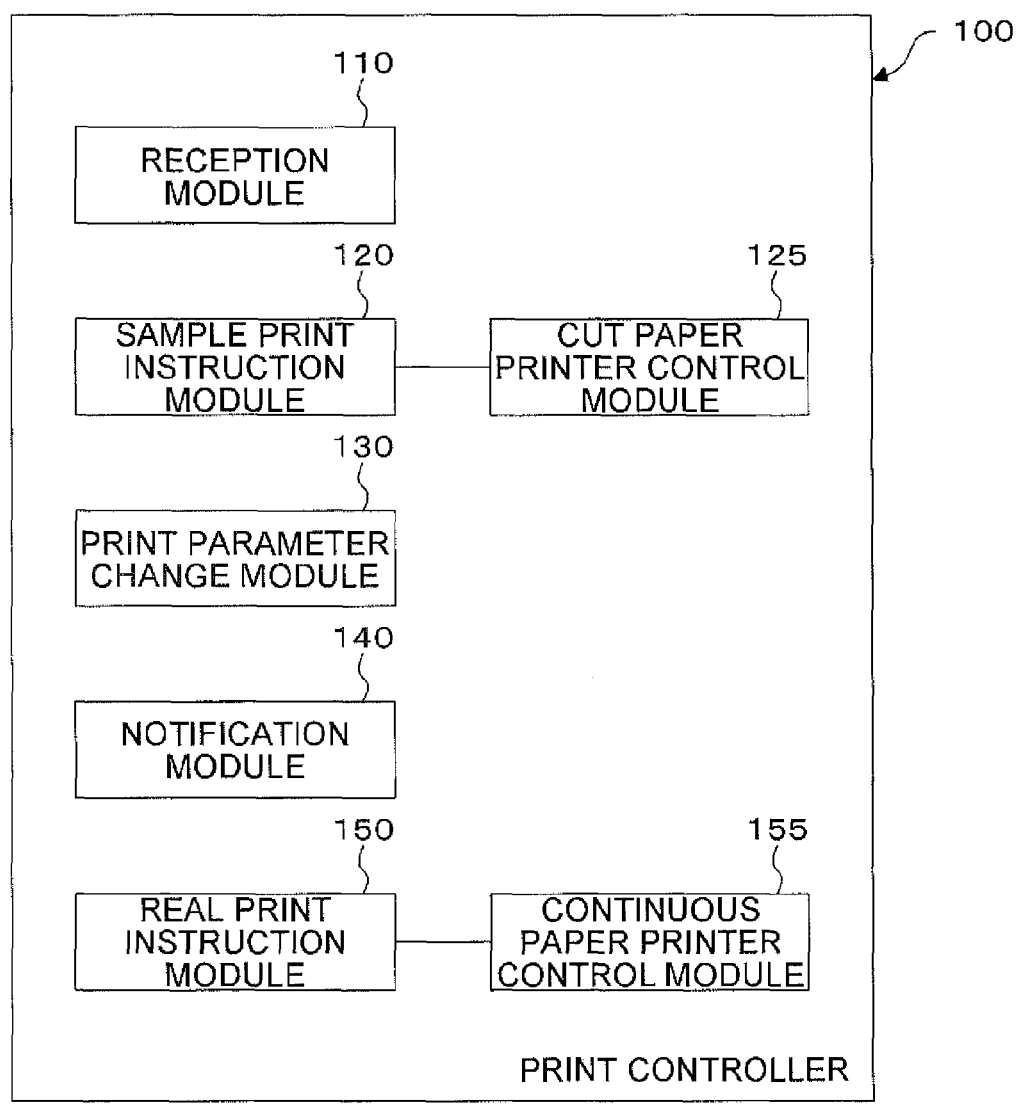
FIG. 1 is a conceptual module configuration view illustrating a configuration example according to a first exemplary embodiment.

Prior to description on exemplary embodiments of the present invention, the assumption or background thereof will first be described. The descriptions are intended to facilitate the understanding of the exemplary embodiments.

There exists a function to print only one copy and confirm a result of the printing while ignoring the setting of the number of copies before printing a large number of copies. This function is called a test print (hereinafter, also referred to as a sample print or a proof print). The description "ignoring the setting of the number of copies" used herein means executing a sample print irrespective of the number of copies, instead of printing a large number of copies from the beginning, in a real print (hereinafter, also referred to as a present print).

In general, after visually checking an output product output in the sample print by an operator, if there is a problem in the output product, correction (change in job options) of various settings, such as color adjustment, positioning of a print image on a recording sheet, or the like, is made, a sample print is repeatedly executed with the corrected settings, and, when it is checked that there is no problem in the output product, the entire number of copies (the first set number of copies) is output as a real print. Meanwhile, for a sample print for which it is checked that there is no problem in the output product, since the sample print has the same workmanship as the real print, the sample print may be regarded as the first copy of the real print, and the number of prints of the real print may be changed to "(the first set number of copies)−1." In particular, in such a case, in a variable print to be described later, the first record or the last record may be assumed as an object of the sample print. This is because the entire print products are aligned by adding the sample print to the beginning or end of the real print (i.e., by saving time to search a page in the middle). In addition, in a case where a sample print of plural pages is executed, the number of prints of the real print may be changed to "(the first set number of copies)−N(the number of pages of the sample print)." Then, a record of plural pages consecutive from the first record or the last record may be assumed as an object of the sample print.

Operation method (1): In an operation associated with a job definition format (JDF) work flow system, there is an operation method of again transmitting a real print job, separate from a sample print job, from the JDF work flow system after the sample print is completed.

In this operation method, after notifying the JDF work flow system side that the sample print job with the number of copies set as 1 has been completed, the real print job with the desired set number of copies is again transmitted from the JDF work flow system.

In this case, since the sample print job is different from the real print job, it is not guaranteed that an option set in the sample print job is equal to an option set in the real print job.

In addition, since cost information of sheets used for a print is different between the sample print and the real print, in order to calculate the costs incurred in the entire job, it is necessary for an administrator to specify which sample print job corresponds to the real print job and add the cost information of each job.

Operation method (2): In an operation associated with a JDF work flow system, there is an operation method in which an operator of a printer performs output and check of a sample print and a correction of a problem, and the JDF work flow system side is notified of only the completion of a real print.

The number of copies for a job is set as 1 when the sample print is executed in the printer and is returned to the original when the sample print is completed and, thereafter, the real print is executed.

In this operation method, the sample print and the real print use the same job.

However, the JDF work flow system side is not able to determine the progress until the real print is completed.

This is because it is necessary for a person to determine whether or not an output product is as expected, and the sample print completion is not able to be automatically determined and notified.

In addition, since it is not clear which setting change causes the printer side to determine that there is no problem in the sample print output, it is not able to be known which setting the real print is output in.

Hereinafter, various exemplary embodiments suitable to achieve the present invention will be described with reference to the accompanying drawings.

First Exemplary Embodiment

FIG. 1 is a conceptual module configuration view illustrating a configuration example of a first exemplary embodiment.

Meanwhile, a module, in general, indicates a logically separable component such as software (a computer program) or hardware. Accordingly, a module in the present exemplary embodiment indicates not only a module in a computer program but also a module in a hardware configuration. Hence, descriptions of the present exemplary embodiment also include descriptions of a computer program to function as the module (a program to cause a computer to execute each process, a program to cause a computer to function as each unit, and a program to cause a computer to implement each function), a system, and a method. Here, for convenience of descriptions, the expressions "store," "cause to store," and equivalent expressions thereto will be used, and when an exemplary embodiment is a computer program, the expressions indicate causing data or the like to be stored in a storage device or performing a control to store data or the like in a storage device. In addition, one module may correspond to one function. In implementation, however, one module may be configured as one program, plural modules may be configured as one program, and in reverse, one module may be configured as plural programs. In addition, plural modules may be executed by one computer, or one module may be executed by plural computers in a distributed or parallel environment. In addition, one module may include another module. In addition, hereinafter, the term "connection" is also used in a case of a logical connection (e.g., data exchange, instructions, and a reference relationship among data), in addition to a physical connection. The term "predetermined" refers to being determined prior to a target processing, and includes the meaning of being determined according to a circumstance/state at or until a specific time point before a processing by the present exemplary embodiment is started, or prior to a target processing even after a processing by the present exemplary embodiment is started. When plural "predetermined values" exist, the values may be different from each other, or two or more of the values (including any values, of course) may be identical to each other. A description indicating that "when it is A, B is executed" is used to indicate that "whether it is A is determined, and when it is determined that it is A, B is executed," except for a case where the determination of whether it is A is unnecessary.

In addition, a system or a device includes a case where the system or the device is implemented by, for example, one computer, one hardware component, and one device, in addition to a case where plural computers, hardware components, devices and others are configured to be connected to each other by a communication unit such as a network (including one-to-one corresponding communication connection). The terms "device" and "system" are used to have the same meaning. Of course, the "system" does not include a system merely meaning a social "mechanism" (social system) which is human decision.

In addition, target information is read from a storage device per processing by each module or for each of plural processes which is executed in a module. After the processing is executed, the processing result is recorded in the storage device. Accordingly, descriptions of the reading from the storage device prior to the processing and the recording in the storage device after the processing may be omitted. In addition, the storage device may include, for example, a hard disk, a random access memory (RAM), an external storage medium, a storage device through a communication line, a resistor within a central processing unit (CPU), and the like.

A print controller 100 according to this exemplary embodiment causes a printer, which is different from a printer to execute a real print, to execute a test print. As illustrated in the example in FIG. 1, the print controller 100 includes a reception module 110, a sample print instruction module 120, a cut paper printer control module 125, a print parameter change module 130, a notification module 140, a real print instruction module 150, and a continuous paper printer control module 155. In addition, the print controller 100 is connected with a work flow processor 200, a cut paper printer 290, and a continuous paper printer 295, which will be described later with reference to the examples in FIGS. 2 and 3. The print controller 100 executes a test print with one print job received from the work flow processor 200 as a print job for a test print and, thereafter, executes a real print with the received print job as a real print job. However, there is a case where a job option is changed by the test print. The print controller 100 may be connected to the cut paper printer and the continuous paper printer. Here, the continuous paper printer is used as a printer to execute the real print, and the cut paper printer is used as a printer to execute the test print.

The reception module 110 receives a print job in the form of a job ticket from the work flow processor 200 which is an example of a print work flow system.

The sample print instruction module 120 is connected to the cut paper printer control module 125. The sample print instruction module 120 interprets the print job received by the reception module 110. Then, as a result of the interpretation of the print job, when the print job includes the effect that a print process according to the print job should be executed by the continuous paper printer 295 and the effect that a test print according to the print job should be executed, in order to execute the test print using print data included in the print job, a print job of a new test print is generated from the print job received by the reception module 110. Then, the sample print instruction module 120 instructs the cut paper printer control module 125 to cause the cut paper printer 290 to execute a print process of the test print.

In addition, a print attribute of the print job may be interpreted. In this case, as a result of the interpretation of the print attribute of the print job, when the effect that a print process according to the print job should be executed by the continuous paper printer 295 and the effect that a test print according to the print job should be executed are included in the print attribute, in order to execute the test print using print data included in the print job, the sample print instruction module 120 generates a print job of a new test print from the print job received by the reception module 110. Then, the sample print instruction module 120 instructs the cut paper printer control module 125 to cause the cut paper printer 290 to execute a print process of the test print.

In addition, the sample print instruction module 120 may set the number of output copies according to the print job as 1 as a test print. Since this is the test print and the number of output copies according to the print job is generally 1, an operator does not need to set the number of copies.

In addition, when the print job is a variable print as a test print, the sample print instruction module 120 may instruct a print with one record of print data included in the print job. The variable print refers to performing a printing while changing print contents as in print products such as direct mails (DMs) in which addresses are in the same position but contents thereof are changed. Here, one print content is recorded in one record. This is because the variable print results in plural print products, and only one of the plural print products may be printed as a test print. One record as a test print object may be a predetermined record (e.g., a first record), a randomly selected record, or a record selected by an operator.

In addition, a reduction mode in which a reduction process is executed such that the entire layout of one page is recorded on a recording sheet used in the test print may be included in the output form in the test print instructed by the sample print instruction module 120.

The cut paper printer control module 125 instructs the cut paper printer 290 to execute the print process of the test print according to the instruction from the sample print instruction module 120.

The print parameter change module 130 hands over a result of print parameter adjustment executed in the test print to a print parameter in a real print. For example, as a result of the test print, when an operation to change the print parameter is made by an operator who views the result, the print parameter is changed according to the operation. Here, the term "print parameter" refers to an output option related to the designation of the output form. Examples of the print parameter may include a scaling factor (including execution or not of scaling, and the like), rotation, slant correction, a type of a raster image processor (RIP) preparing a print image, a color adjustment parameter, a color gamut, a color tone, or the like. In particular, the print parameter includes an image quality parameter (a color gamut, a color tone, or the like). The print parameter will be described later with reference to the example in FIG. 13.

When a print job of the test print is generated, the notification module 140 notifies the work flow processor 200 of the effect that the print job has been held.

"The notification on the effect that the print job has been held" may be made any time after it is proved that the print job of the test print is generated. In addition, "that the print job of the test print is generated" refers to that "the effect that a print process according to the print job should be executed by the continuous paper printer as a result of interpretation of the print job and the effect that a test print according to the print job should be executed is included in the print job."

For example, "the notification on the effect that the print job has been held" may be made after end information indicating that the test print has been ended is received from the cut paper printer. In this case, upon receiving from the cut paper printer 290 the end information indicating that the test print instructed to be executed by the sample print instruction module 120 has been ended, the notification module 140 notifies the work flow processor 200 of the effect that the print job has been held.

In addition, "the notification on the effect that the print job has been held" may be made immediately after it is proved that the print job of the test print is generated, after the print job of the test print has been generated, after the cut paper printer 290 is instructed to execute a print process, or the like.

In addition, the notification module 140 may unify information related to a test print including at least the number of copies and information related to a real print including at least the number of copies and notify the work flow processor 200 of the unified information.

Upon receiving, from the work flow processor 200 or an operator, an instruction of the effect that the holding of the print job is released, the real print instruction module 150 sends print data included in the print job received by the reception module 110 and the print parameter changed according to the image quality parameter changed in the print job of the test print to the continuous paper printer 295 and instructs the continuous paper printer control module 155 to execute a real print job.

According to the instruction from the real print instruction module 150, the continuous paper printer control module 155 instructs the continuous paper printer 295 to execute a real print process.

Figure 2:
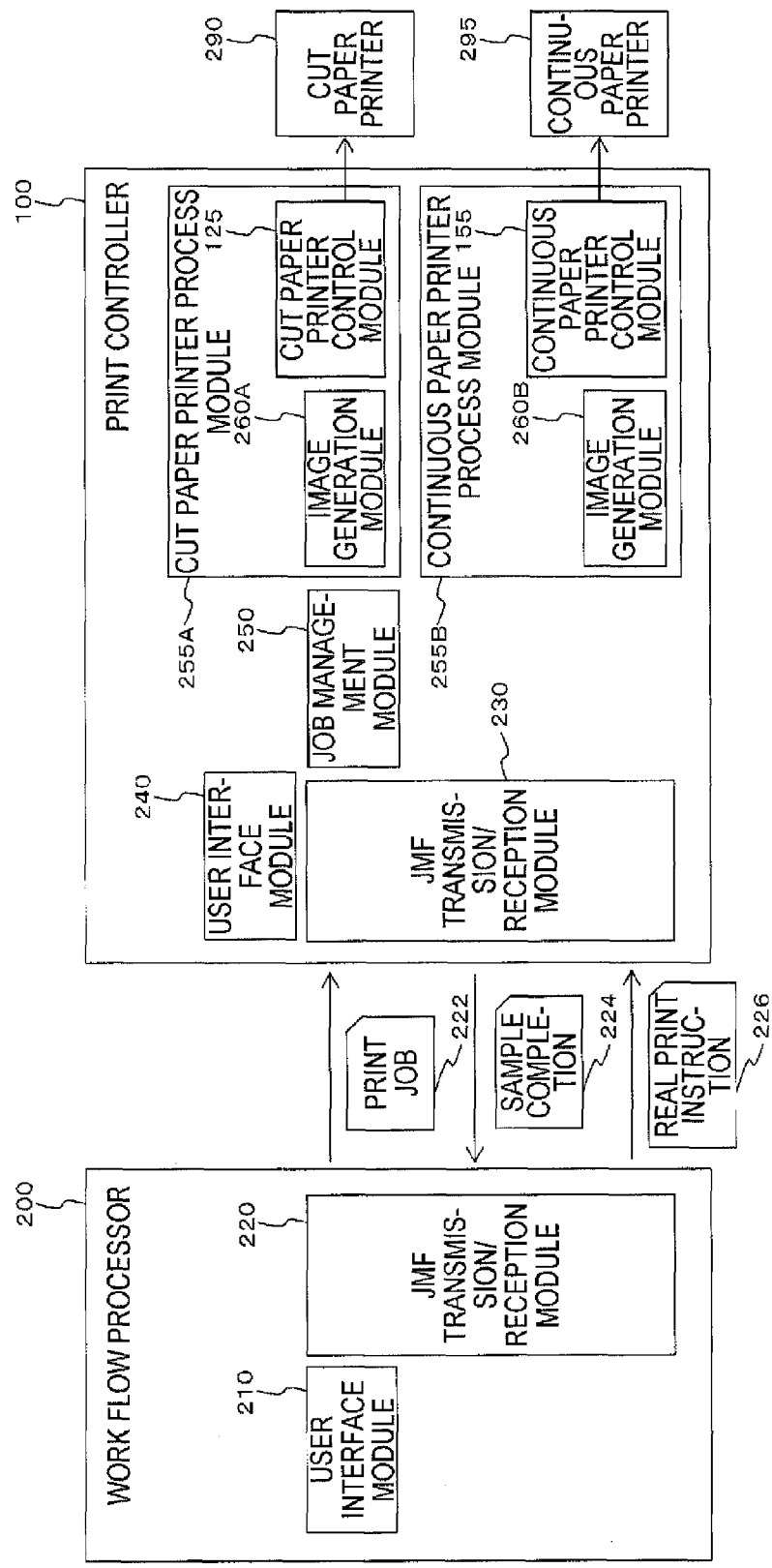
FIG. 2 is an explanatory view illustrating a configuration example of a system including a print controller, a work flow processor, a cut paper printer, and a continuous paper printer.

FIG. 2 is an explanatory view illustrating a configuration example of a system including the print controller 100, the work flow processor 200, the cut paper printer 290, and the continuous paper printer 295. This system is configured base on the JDF which is the generic term for major process automation specifications of "The International Cooperation for the Integration of Processes in Prepress, Press, and Postpress organization" (CIP4). The basic function of the JDF includes the provision of meta data used for description of the entire print job process, the provision of flexible work flow automation method, the execution of a query for allowing a work flow or a management information system (MIS) to determine the JDF function of a new device, and the provision of a command language to instruct a device in a work flow or MIS system work site.

Although one cut paper printer 290 and one continuous paper printer 295 are illustrated in the example in FIG. 2, the number of paper printers 290 and the number of continuous paper printers 295 may be two or more. In addition, among plural printers, one cut paper printer 290 for a sample print may be selected, and one cut paper printer 290 for a real print may be selected.

The work flow processor 200 includes a user interface module 210 and a job messaging format (JMF) transmission/reception module 220. In addition, the work flow processor 200 may be implemented with print work flow software. In addition, the work flow processor 200 may be included in the print controller 100.

The work flow processor 200 may include a sample print instruction in a print job 222. In addition, the work flow processor 200 may receive information of sample completion 224 from the print controller 100. Then, the work flow processor 200 may transmit a real print instruction 226 to the print controller 100.

The user interface module 210 receives an operation by an operator or the like and outputs a result of a process or the like. For example, the user interface module 210 receives an instruction of the print job 222, presents a result of the sample completion 224, and receives an instruction of the real print instruction 226. The user interface module 210 may receive an operation of a user using a mouse, a keyboard, a touch panel, a voice, an eye, a gesture or the like and combine a voice output to a voice output device such as a speaker, a vibration and the like, in addition to display on a display device such as a liquid crystal display.

The JMF transmission/reception module 220 transmits and receives messages (the print job 222, the sample completion 224, and the real print instruction 226) between the work flow processor 200 and the print controller 100. In addition, the JMF is a communication format having a multi-level function and a command language which is a portion of JDF. Like the JDF, a JMF element, which is the uppermost level element in the JDF, also exists. The JMF is defined in the JDF specifications.

The print job 222 is an example of "print job of job ticket format." The sample completion 224 is an example of "test print-related information." The real print instruction 226 is an example of a "response including information indicating approval for a test print."

The print controller 100 includes a JMF transmission/reception module 230, a user interface module 240, a job management module 250, a cut paper printer process module 255A, and a continuous paper printer process module 255B.

The reception module 110 and the notification module 140 illustrated in the example in FIG. 1 are included in the JMF transmission/reception module 230. The JMF transmission/reception module 230 transmits and receives messages (the print job 222, the sample completion 224, and the real print instruction 226) between the work flow processor 200 and the print controller 100.

Like the user interface module 210, the user interface module 240 receives an operation by an operator or the like and outputs a result of a process or the like. However, it is common that the operator or the like for the work flow processor 200 is a person who has a role as an administrator for print, whereas it is common that the operator or the like for the print controller 100 is a worker of a sample print and a real print.

The sample print instruction module 120, the print parameter change module 130, and the real print instruction module 150 illustrated in the example in FIG. 1 are included in the job management module 250. The job management module 250 controls the cut paper printer process module 255A and the continuous paper printer process module 255B so as to cause the cut paper printer 290 and the continuous paper printer 295 to execute the sample print or the real print according to the print job 222 or the real print instruction 226.

The cut paper printer process module 255A includes an image generation module 260A and a cut paper printer control module 125. The cut paper printer process module 255A causes the cut paper printer 290 to execute the test print according to the control of the job management module 250.

The image generation module 260A generates a sample print image. Of course, the image generated here is an image which may be printed by the cut paper printer 290, for example, a bitmap image (raster image).

The cut paper printer control module 125 is connected to the cut paper printer 290. The cut paper printer control module 125 hands over the sample print image generated by the image generation module 260A to the cut paper printer 290 for print according to the control of the job management module 250.

The cut paper printer 290 is connected to the cut paper printer control module 125. The cut paper printer 290 receives a print image from the cut paper printer control module 125 and executes a test print.

The continuous paper printer process module 255B includes an image generation module 260B and a continuous paper printer control module 155. The continuous paper printer process module 255B causes the continuous paper printer 295 to execute the real print according to the control of the job management module 250.

The image generation module 260B generates a real print image. Of course, the image generated here is an image which may be printed by the continuous paper printer 295, for example, a bitmap image (raster image).

The continuous paper printer control module 155 is connected to the continuous paper printer 295. The continuous paper printer control module 155 hands over the real print image generated by the image generation module 260B to the continuous paper printer 295 for print according to the control of the job management module 250.

The continuous paper printer 295 is connected to the continuous paper printer control module 155. The continuous paper printer 295 receives a print image from the continuous paper printer control module 155 and executes a real print.

The output reproducibility of the cut paper printer 290 may be adjusted to the output reproducibility of the continuous paper printer 295. There is a case where it is desirable to check a color tone or the like in color printing, in addition to a layout, a typographical error and the like. In this case, the output reproducibility of the cut paper printer 290 is adjusted to the output reproducibility of the continuous paper printer 295. Here, the output reproducibility refers to a color gamut, a color gradation, a coloring scheme or the like which may be expressed by an object printer. By "adjusting the output reproducibility of the cut paper printer 290 to the output reproducibility of the continuous paper printer 295," the color gamut or the like expressed by the continuous paper printer 295 executing the real print becomes equal to the color gamut or the like expressed by the cut paper printer 290 executing the test print. Therefore, even when no print is made by the continuous paper printer 295, the color tone or the like may be checked by print by the cut paper printer 290. For example, a printer profile recording the output reproducibility may be adjusted. Specifically, a color matching technique may be used to change a printer profile of the cut paper printer 290 from a printer profile of the continuous paper printer 295. In addition, the printer profile may be changed according to a sheet to be printed.

Figure 3:
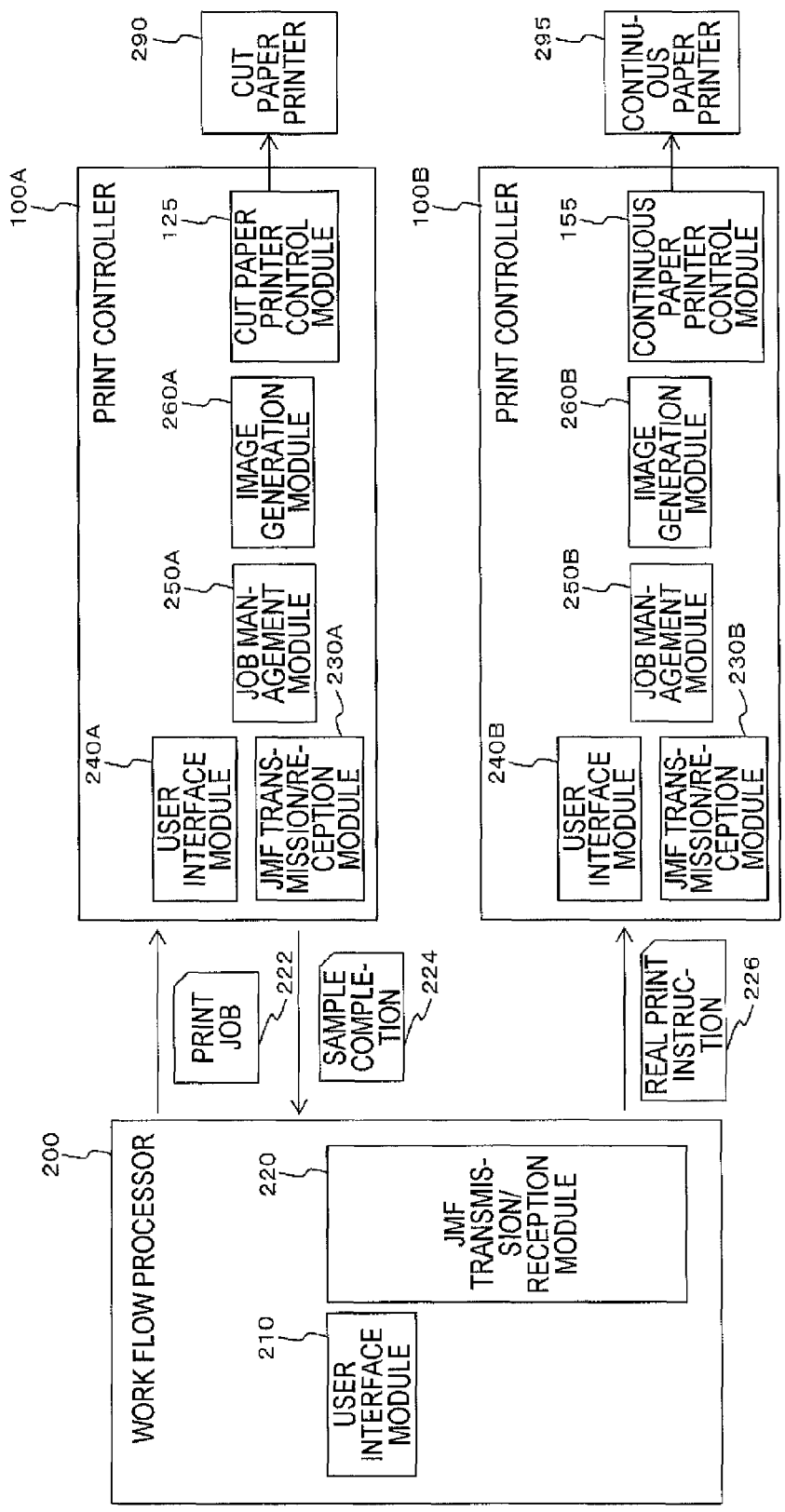
FIG. 3 is an explanatory view illustrating a configuration example of a system including a print controller, a work flow processor, a cut paper printer, and a continuous paper printer.

FIG. 3 is an explanatory view illustrating a configuration example of a system including a print controller 100A, a print controller 100B, a work flow processor 200, a cut paper printer 290, and a continuous paper printer 295.

The work flow processor 200 has the same module configuration as the work flow processor 200 illustrated in the example in FIG. 2, except that the work flow processor 200 hands over a print job 222 to a combination of the print controller 100A which causes a sample print to be executed and the cut paper printer 290, receives a sample completion 224 from the combination and then hands over a real print instruction 226 to a combination of a print controller 100B which causes a real print to be executed and the continuous paper printer 295.

In addition, although one combination of the print controller 100A and the cut paper printer 290 and one combination of the print controller 100B and the continuous paper printer 295 are illustrated in the example in FIG. 3, the number of combinations may be two or more, respectively. Then, a combination of the print controller 100A and the cut paper printer 290 for the sample print may be selected from the plural combinations, and a combination of the print controller 100B and the continuous paper printer 295 for the real print may be selected from the plural combinations.

The print controller 100A includes a JMF transmission/reception module 230A, a user interface module 240A, a job management module 250A, an image generation module 260A, and a cut paper printer control module 125. The modules in the print controller 100A are equivalent to the JMF transmission/reception module 230, the user interface module 240, the job management module 250, and the cut paper printer process module 255A (the image generation module 260A and the cut paper printer control module 125) in the print controller 100 illustrated in the example in FIG. 2. That is, the print controller 100A functions as the print controller 100 dedicated for the cut paper printer 290. Therefore, in order to execute the sample print, the print controller 100A is instructed (to execute the print job 222).

The print controller 100B includes a JMF transmission/reception module 230B, a user interface module 240B, a job management module 250B, an image generation module 260B, and a continuous paper printer control module 155. The modules in the print controller 100B are equivalent to the JMF transmission/reception module 230, the user interface module 240, the job management module 250, and the continuous paper printer process module 255B (the image generation module 260B and the continuous paper printer control module 155) in the print controller 100 illustrated in the example in FIG. 2. That is, the print controller 100B functions as the print controller 100 dedicated for the continuous paper printer 295. Therefore, in order to execute the real print, the print controller 100B is instructed (to execute the real print instruction 226).

Figure 4A:
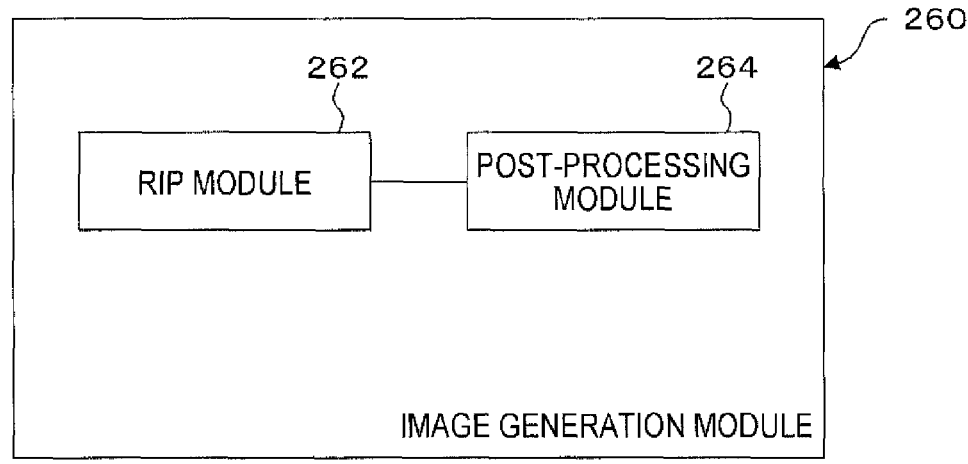
FIGS. 4A and 4B are conceptual module configuration views illustrating a configuration example of an image generating module.
Figure 4B:
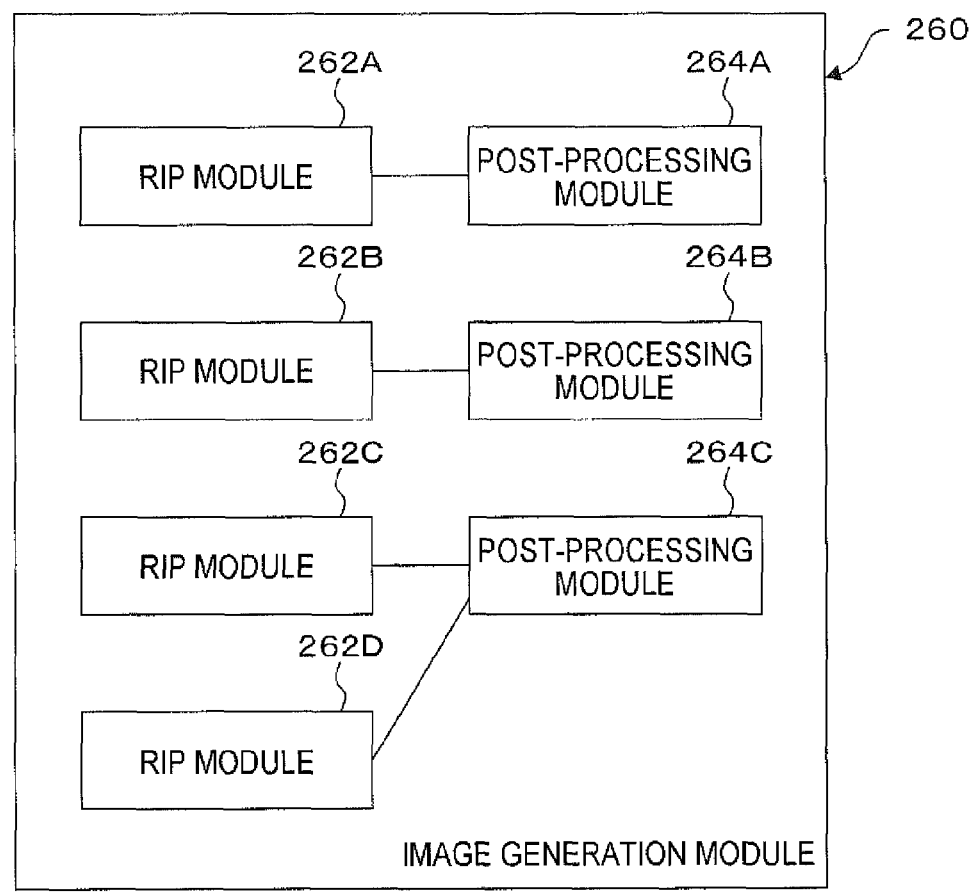

FIGS. 4A and 4B are conceptual module configuration views illustrating a configuration example of the image generation module 260. The image generation module 260 may be configured as follows, although the image generation module 260 may include only a RIP module 262.

FIG. 4A illustrates an example where the image generation module 260 includes a RIP module 262 and a post-processing module 264. This example is to speed up a process as a whole by sharing the process between plural processors (e.g., CPUs, GPUs (Graphics Processing Units), or the like).

The RIP module 262 and the post-processing module 264 are interconnected.

The RIP module 262 interprets a document or image expressed in a high level data format such as a page description language and converts the interpreted document or image into an intermediate language for image generation. Here, the intermediate language may be composed of a vector of a scanning line direction, or the like.

The post-processing module 264 generates an image, which may be printed by a printer (the cut paper printer 290 or the continuous paper printer 295), based on the intermediate language into which the document or image is converted by the RIP module 262.

FIG. 4B illustrates an example where the image generation module 260 includes combinations of plural RIP modules 262 and plural post-processing modules 264. This example is to execute a process in parallel. The post-processing modules 264 lower in processing load than the RIP modules 262 may be responsible for a result of processing by the plural RIP modules 262.

The image generation module 260 includes a RIP module 262A, a RIP module 262B, a RIP module 262C, a RIP module 262D, a post-processing module 264A, a post-processing module 264B, and a post-processing module 264C.

The RIP module 262A and the post-processing module 264A are interconnected, and the RIP module 262B and the post-processing module 264B are interconnected. The RIP module 262C and the RIP module 262D are connected to the post-processing module 264C.

The RIP module 262A, the RIP module 262B, the RIP module 262C, and the RIP module 262D execute a process in parallel. The post-processing module 264A, the post-processing module 264B, and the post-processing module 264C execute a process in parallel. Then, the post-processing module 264C receives a result of the process of the RIP module 262C and the RIP module 262D and generates an image which may be printed by a printer.

Figure 5:
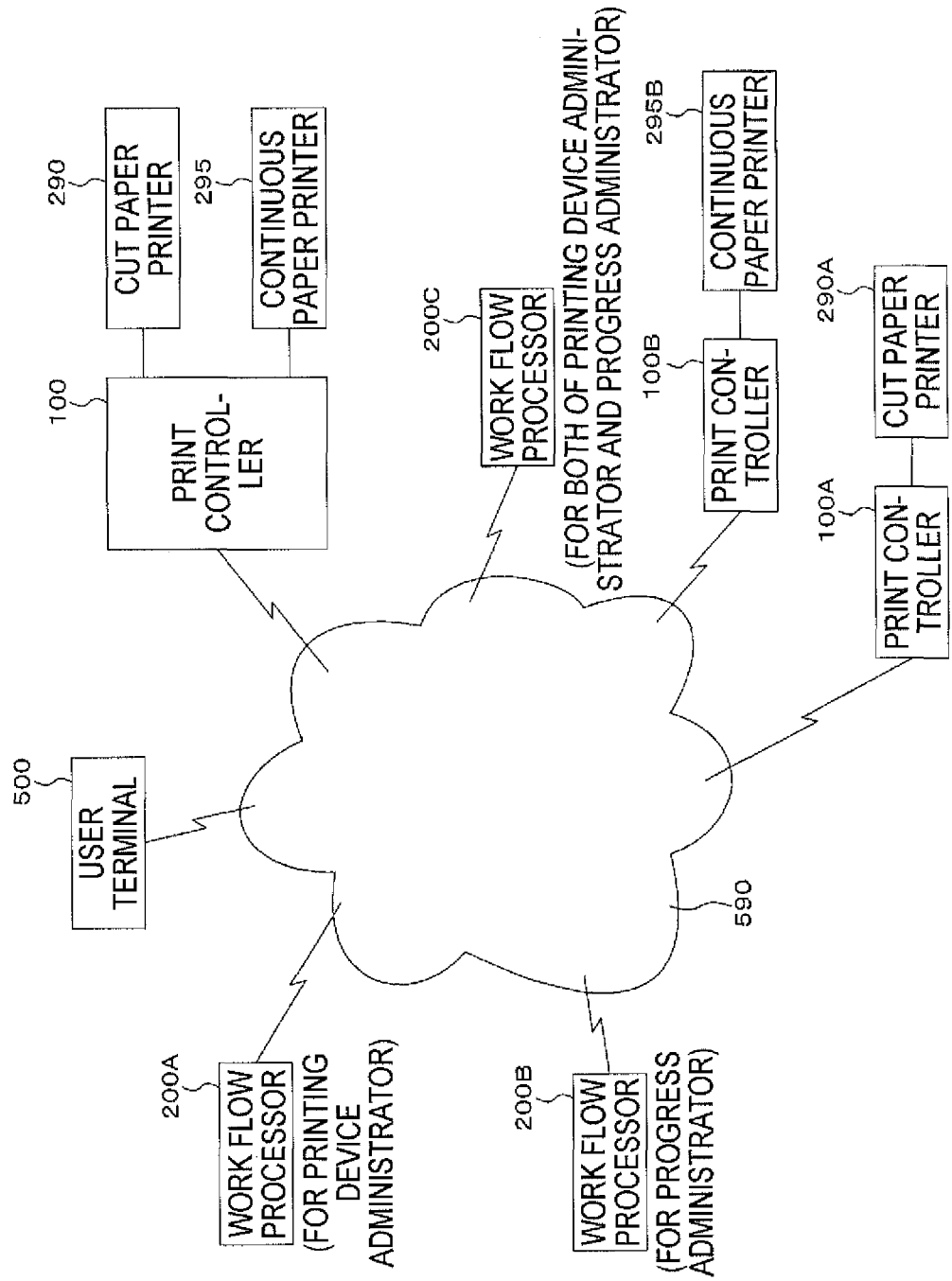
FIG. 5 is an explanatory view illustrating a configuration example of a system according to this exemplary embodiment.

FIG. 5 is an explanatory view illustrating a configuration example of a system according to this exemplary embodiment.

A print controller 100, a print controller 100A, a print controller 100B, a work flow processor (for a printing device administrator) 200A, a work flow processor (for a progress administrator) 200B, a work flow processor (for both of a printing device administrator and a progress administrator) 200C, and a user terminal 500 are interconnected via a communication line 590. The communication line 590 may be a wired communication line, a wireless communication line or a combination thereof. For example, the communication line 590 may be the Internet, an intranet or the like as a communication infrastructure. In addition, the work flow processors 200 may be divided into a work flow processor for a printing device administrator, a work flow processor for a progress administrator, and a work flow processor for both of a printing device administrator and a progress administrator.

For example, according to an instruction from the user terminal 500, the work flow processor (for the printing device administrator) 200A may instruct the print controller 100 for print to cause the cut paper printer 290 to execute a sample print and cause the continuous paper printer 295 to execute a real print. In addition, according to an instruction from the user terminal 500, the work flow processor (for the progress administrator) 200B may instruct the print controller 100A to cause the cut paper printer 290A to execute a sample print and may instruct the print controller 100B to cause the continuous paper printer 295B to execute a real print.

Figure 6:
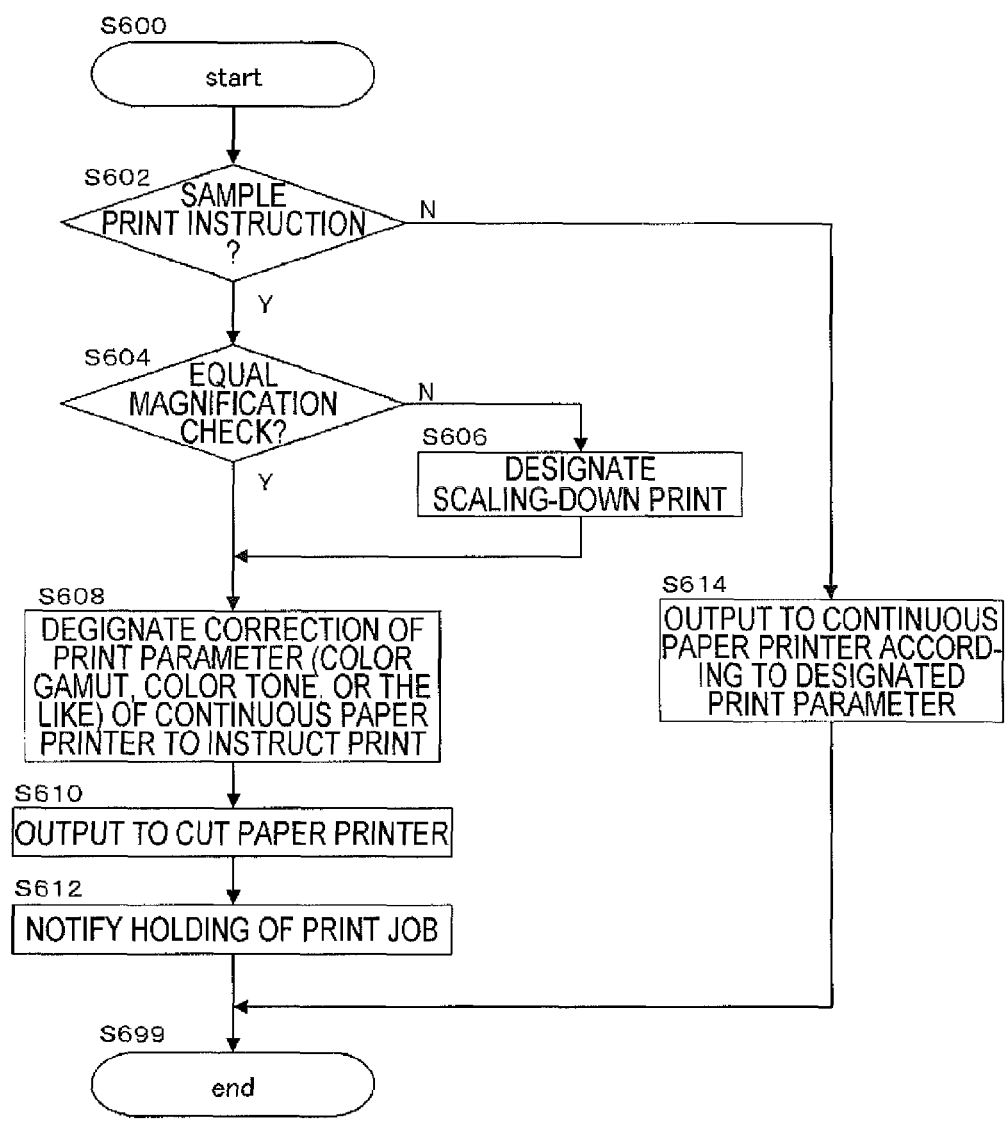
FIG. 6 is a flowchart illustrating an example of a process according to this exemplary embodiment.

FIG. 6 is a flowchart illustrating an example of a process according to this exemplary embodiment.

At Step S602, as a result of interpretation of a received job, it is determined whether or not there is a sample print instruction. If there is a sample print instruction, the process proceeds to Step S604. Otherwise, the process proceeds to Step S614.

At Step S604, it is checked whether or not a scaling factor is an equal magnification as a scaling-down factor. If the scaling factor is an equal magnification as a scaling-down factor, the process proceeds to Step S608. Otherwise, the process proceeds to Step S606. This is because a scaling-down print does not matter since it is a sample print.

At Step S606, a scaling-down print may be designated by an operation of an operator. Here, a scaling-down factor in the scaling-down print may be a fixed factor (e.g., printing two pages on one sheet) may be a factor designated by an operation of the operator. Then, the process proceeds to Step S608. In the meantime, in order to check a moire pattern, character collapse, or the like, a sample print by an equal magnification may be executed.

At Step S608, correction of a print parameter (a color gamut, a color tone, or the like) of a continuous paper printer is designated to instruct a print. The operator visually checks a result of the print and appropriately changes the print parameter according to a result of the check.

At Step S610, the print is output, as a sample print, to the cut paper printer 290.

At Step S612, the print controller 100 notifies the work flow processor 200 of the holding of the print job.

At Step S614, the sample print is output to the continuous paper printer 295 according to the designated print parameter (real print). Then, the process proceeds to Step S699.

Figure 7:
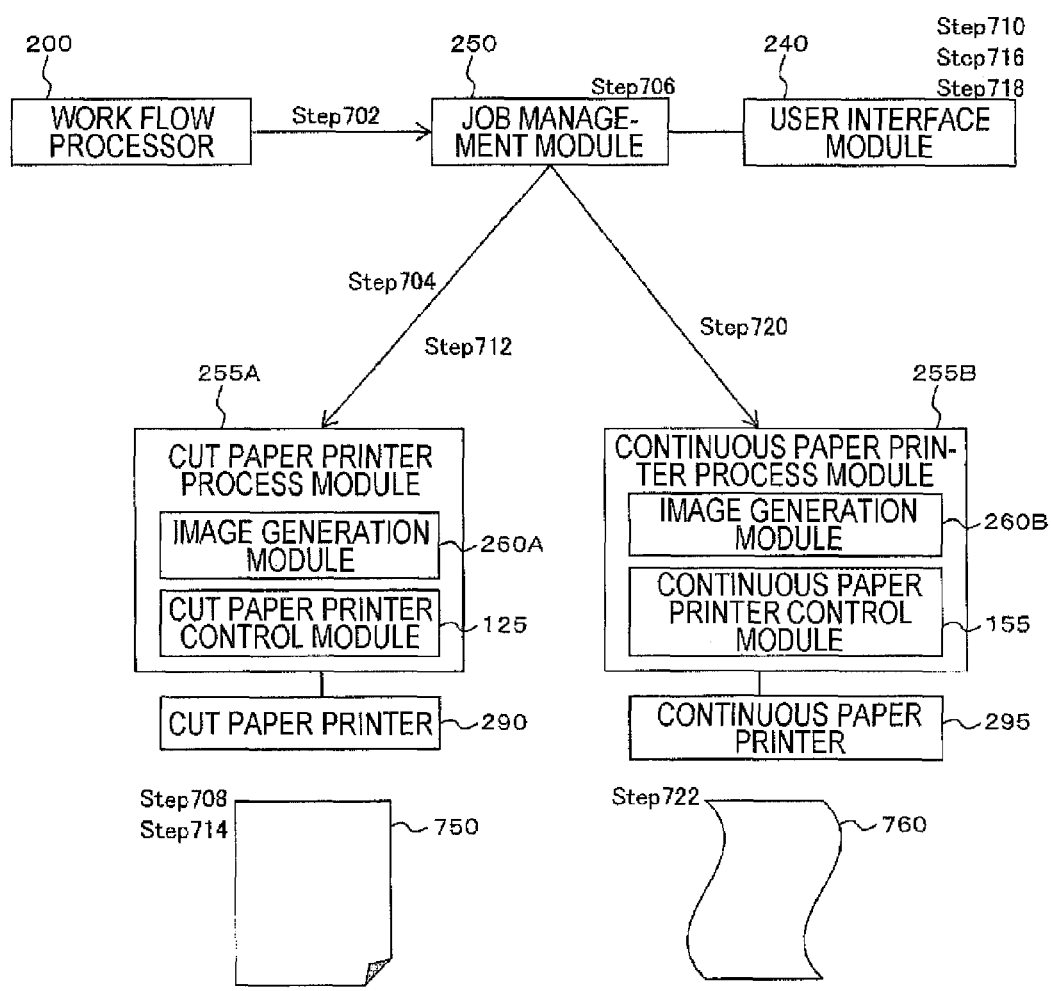
FIG. 7 is an explanatory view illustrating an example of a process according to this exemplary embodiment.

FIG. 7 is an explanatory view illustrating an example of a process according to this exemplary embodiment (the work flow processor 200, the job management module 250, the cut paper printer process module 255A, the continuous paper printer process module 255B, and the user interface module 240).

At Step 702, the work flow processor 200 sends a job as an effective sample print to the work flow processor 200 (the job management module 250). That is, this job contains the effect that a sample print should be executed and the effect that a real print should be executed.

At Step 704, the job management module 250 determines that there is the effect that the sample print should be executed and transmits print data to the cut paper printer process module 255A.

At Step 706, the job management module 250 holds the job received in Step 702. Here, the holding is to put the execution of the real print under a standby state until the sample print is ended. Then, the work flow processor 200 is notified of the holding.

At Step 708, the cut paper printer 290 outputs a print product (a cut paper) 750 according to the control of the cut paper printer process module 255A (first sample print).

At Step 710, the operator visually checks the print product (the cut paper) 750, and the user interface module 240 changes the setting of the print parameter according to an instruction of the operator and instructs to execute the sample print.

At Step 712, the job management module 250 transmits print data to the cut paper printer process module 255A according to an instruction of sample print designation.

At Step 714, the cut paper printer 290 outputs a print product (a cut paper) 750 according to the control of the cut paper printer process module 255A (second sample print).

At Step 716, Step 710 to Step 714 are repeated until an output result (the print product (the cut paper) 750) meets an expectation.

At Step 718, the holding is released when the output result (the print product (the cut paper) 750) meets the expectation. Here, the release of the holding is an instruction to end the sample print or an instruction to execute the real print.

At Step 720, the job management module 250 transmits print data to the continuous paper printer process module 255B according to an instruction of real print designation. This real print takes over the setting of the print parameter in the sample print end.

At Step 722, the continuous paper printer 295 outputs a print product (a continuous paper) 760 according to the control of the continuous paper printer process module 255B (real print).

Figure 8:
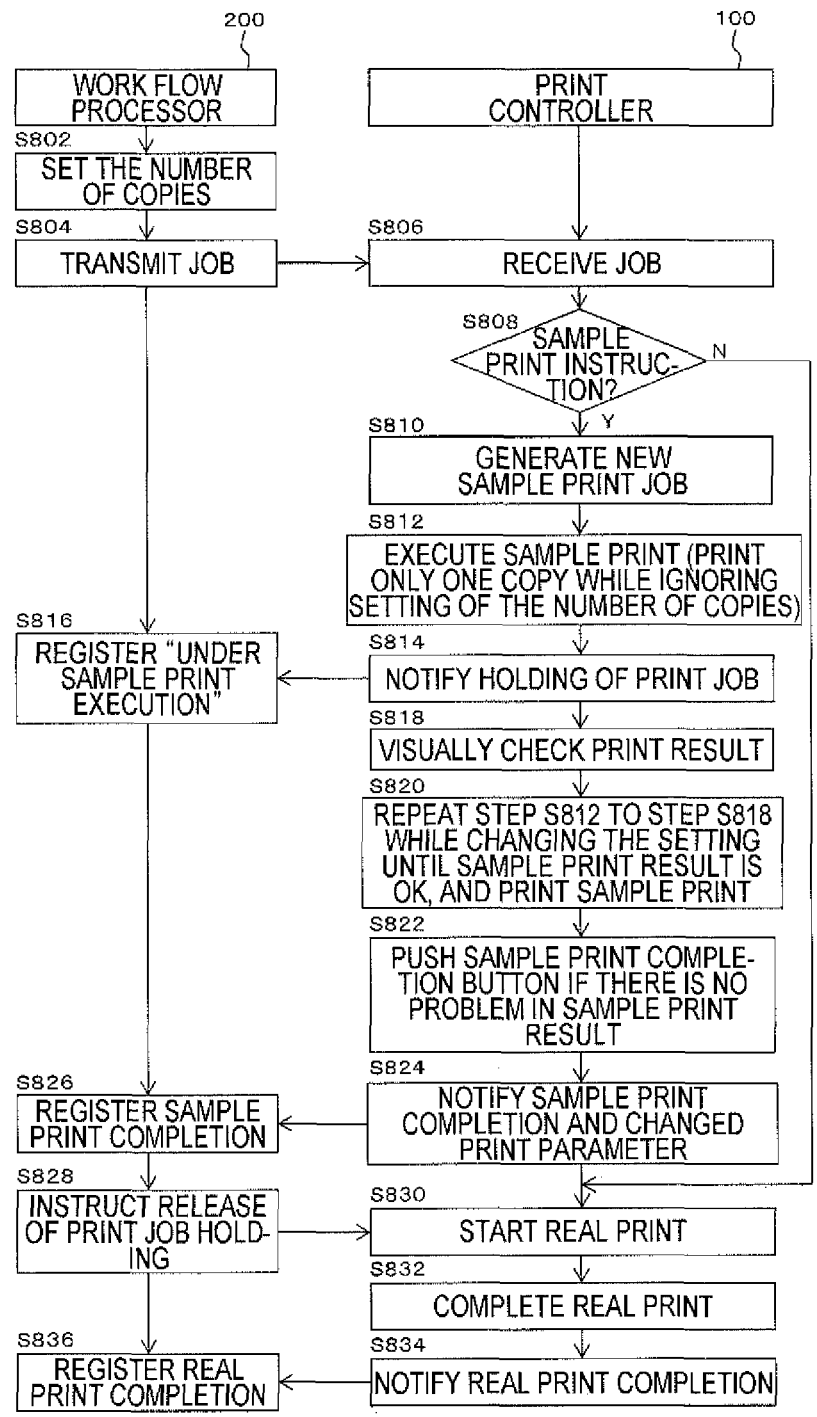
FIG. 8 is a flowchart illustrating an example of a process according a first exemplary embodiment.

FIG. 8 is a flowchart illustrating an example of a process according the first exemplary embodiment.

At Step S802, the work flow processor 200 sets the number of copies in a real print according to an operation of an operator.

At Step S804, the work flow processor 200 transmits a job to the print controller 100. In addition, an instruction of a sample print is included in this job.

At Step S806, the print controller 100 receives the job from the work flow processor 200.

At Step S808, the print controller 100 determines whether or not there is an instruction of a sample print. If there is an instruction of the sample print, the process proceeds to Step S810. Otherwise, the process proceeds to Step S830.

At Step S810, the print controller 100 generates a new sample print job.

At Step S812, the print controller 100 executes a sample print since the instruction of the sample print is included in the job. Only one copy is printed while ignoring the setting of the number of copies.

At Step S814, the print controller 100 notifies the work flow processor 200 of the holding of the print job.

At Step S816, the work flow processor 200 registers "during sample print execution."

At Step S818, the operator of the print controller 100 visually checks a print result.

At Step S820, the print controller 100 repeats Step S812 to Step S818 while changing the setting until the sample print result is OK, and prints the sample print. The setting may include, for example, change of a scaling factor or the like.

Figure 10:
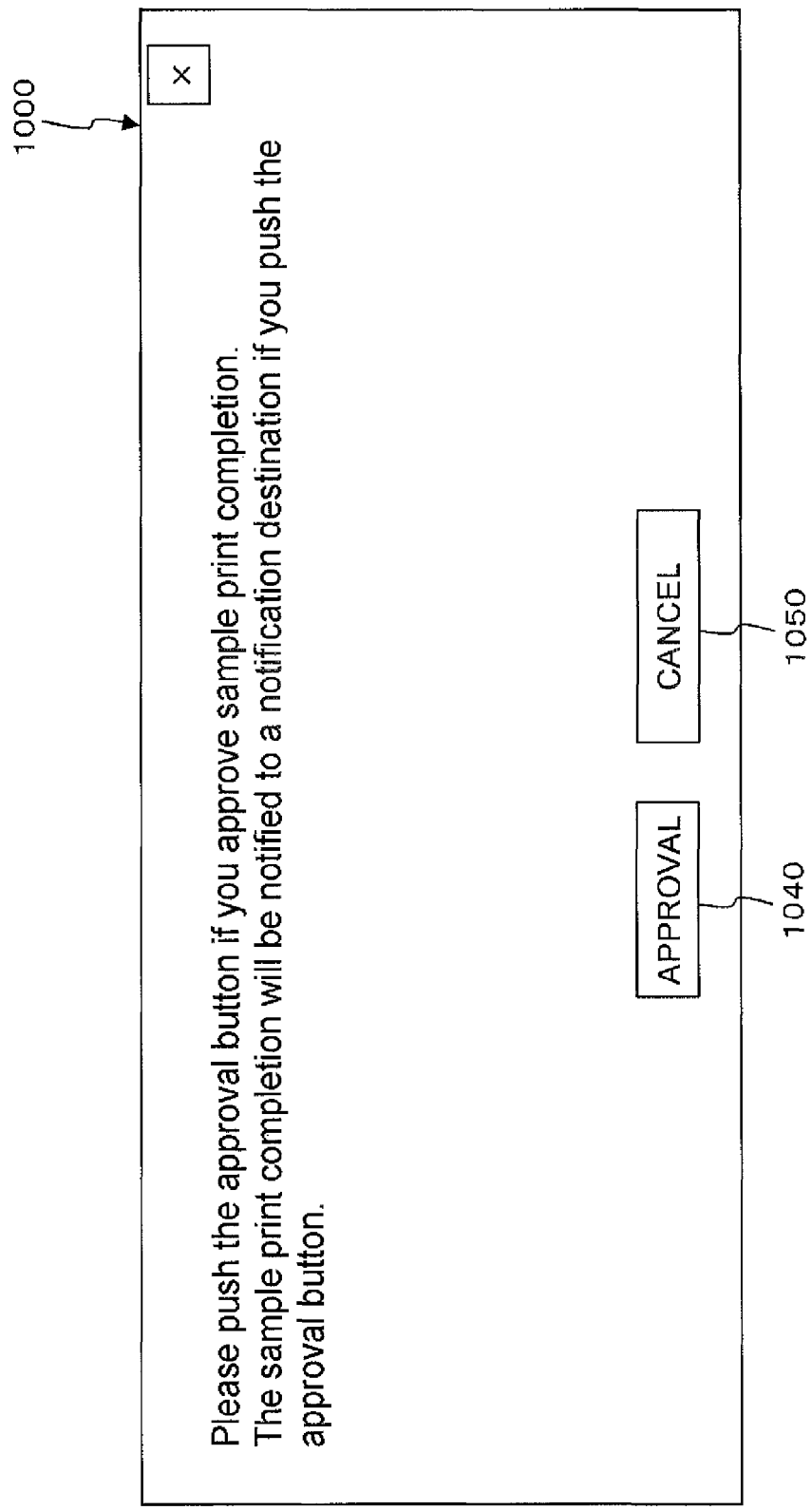
FIG. 10 is an explanatory view illustrating an example of display of a sample print check screen.

At Step S822, the print controller 100 lets the operator push a sample print completion button when there is no problem in the sample print result. For example, a sample print check screen 1000 is presented. FIG. 10 is an explanatory view illustrating an example of display of the sample print check screen 1000. An approval button 1040 and a cancel button 1050 are displayed in the sample print check screen 1000. Then, for example, a message "Push the approval button when you approve sample print completion. The sample print completion will be notified to a notification destination when the approval button is pushed." is displayed in the sample print check screen 1000. When the approval button 1040 is pushed, the sample print is completed and transitions to a real print.

At Step S824, the print controller 100 notifies the work flow processor 200 of the sample print completion and the changed print parameter. For example, a print parameter table 1300 is transmitted as the print parameter. FIG. 13 is an explanatory view illustrating an example of a data structure of the print parameter table 1300. The print parameter table 1300 has a setting item field 1310 and a content field 1320. The setting item field 1310 stores setting items. The content field 1320 stores contents. The setting items include "scaling (which may include a scaling factor)," "RIP type," "Copy number," "Paper feeding," "Sheet type," "Setting of output destination," (e.g., (1) Print, (2) Only RIP with no print, and (3) Only reception and storage,) "Give priority to continuous print," "Give priority to designation in file," (e.g., whether to apply any of option designation in a job and option designation of a postscript file) "Color gamut," (designation of a color space) "Color tone," (designation of lightness and saturation of color), or the like. In addition, the item "Copy number" is set as the number of copies received in Step S806, as it is. This is because this item is not changed by the sample print result. That is, even when the sample print has been completed, the copy number is not changed. Likewise, the item "Scaling" may be set as the setting received in Step S806, as it is. This is particularly because the scaling-down factor designated in Step S606 of the flowchart illustrated in the example in FIG. 6 is applied to only the sample print.

In addition, rather than the entire print parameter table 1300, only the changed print parameter may be notified.

At Step S826, the work flow processor 200 registers the sample print completion.

At Step S828, the work flow processor 200 instructs the print controller 100 to release the print job holding.

At Step S830, the print controller 100 starts a real print.

At Step S832, the print controller 100 completes the real print.

At Step S834, the print controller 100 notifies the work flow processor 200 of the real print completion.

At Step S836, the work flow processor 200 registers the real print completion.

Figure 9:
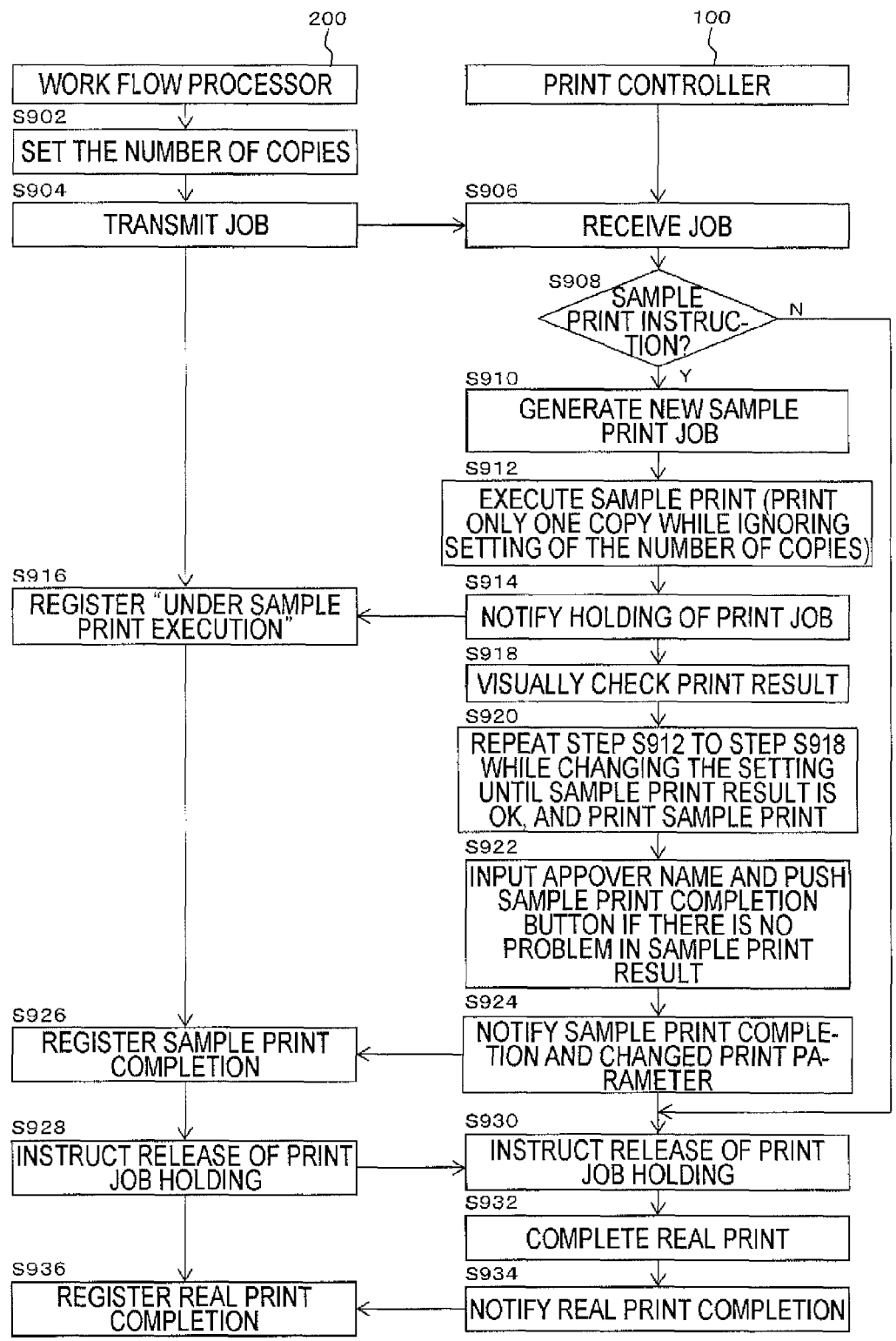
FIG. 9 is a flowchart illustrating an example of another process according to the first exemplary embodiment.

FIG. 9 is a flowchart illustrating an example of another process according to the first exemplary embodiment.

At Step S902, the work flow processor 200 sets the number of copies in a real print according to an operation of an operator.

At Step S904, the work flow processor 200 transmits a job to the print controller 100. In addition, an instruction of a sample print is included in this job.

At Step S906, the print controller 100 receives the job from the work flow processor 200.

At Step S908, the print controller 100 determines whether or not there is an instruction of the sample print. If there is an instruction of the sample print, the process proceeds to Step S910. Otherwise, the process proceeds to Step S930.

At Step S910, the print controller 100 generates a new sample print job.

At Step S912, the print controller 100 executes a sample print since the instruction of the sample print is included in the job. Only one copy is printed while ignoring the setting of the number of copies.

At Step S914, the print controller 100 notifies the work flow processor 200 of the holding of the print job.

At Step S916, the work flow processor 200 registers "during sample print execution."

At Step S918, the operator of the print controller 100 visually checks a print result.

At Step S920, the print controller 100 repeats Step S912 to Step S918 while changing the setting until the sample print result is OK, and prints the sample print. The setting may include, for example, change of a scaling factor or the like.

Figure 11:
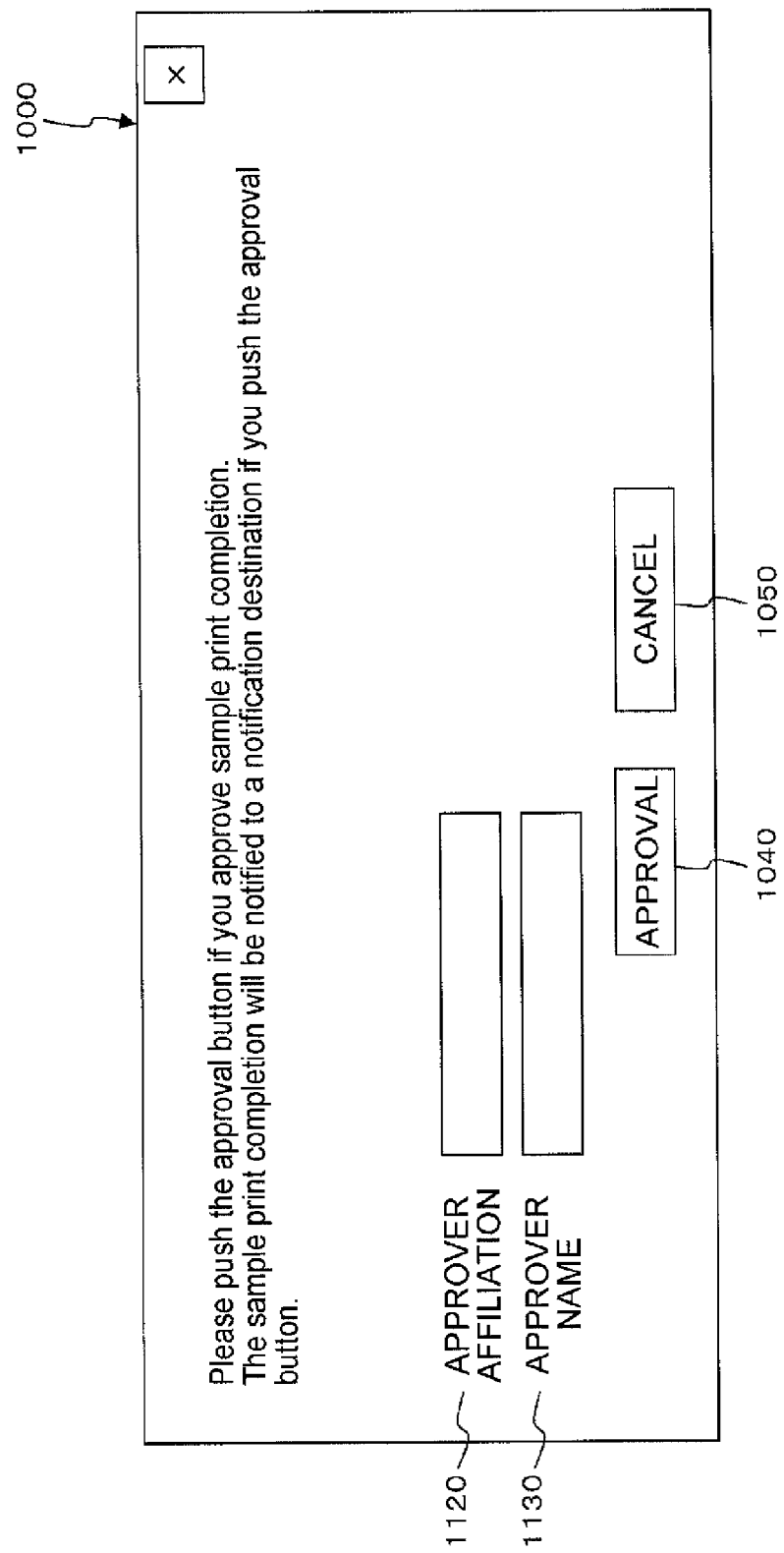
FIG. 11 is an explanatory view illustrating an example of display of a sample print check screen.
Figure 12:
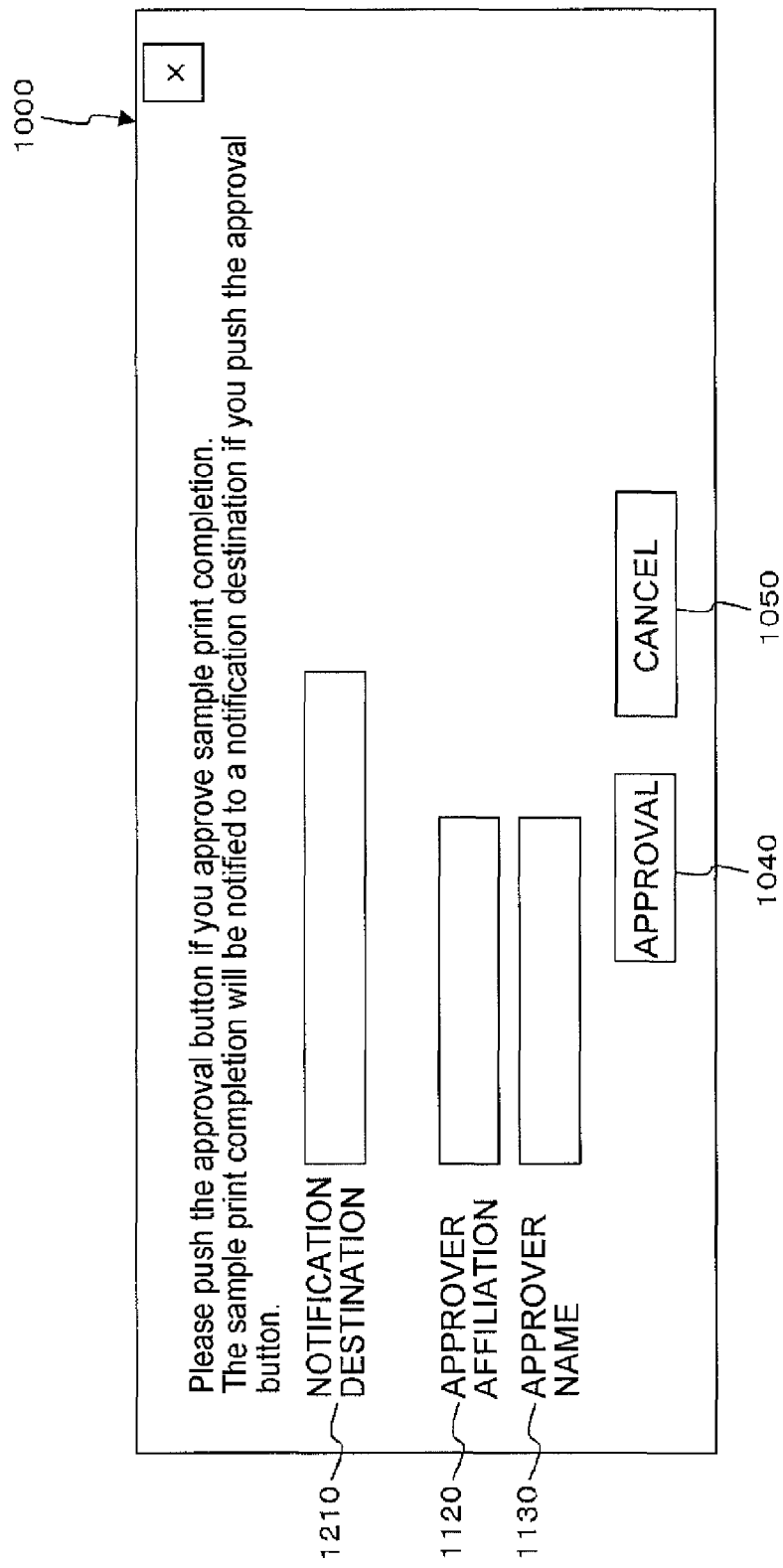
FIG. 12 is an explanatory view illustrating an example of display of a sample print check screen.

At Step S922, the print controller 100 lets the operator input a name of an approver and push a sample print completion button when there is no problem in the sample print result. For example, a sample print check screen 1000 illustrated in FIG. 11 or a sample print check screen 1000 illustrated in FIG. 12 is presented. FIG. 11 is an explanatory view illustrating an example of display of the sample print check screen 1000. An approver affiliation field 1120, an approver name field 1130, an approval button 1040 and a cancel button 1050 are displayed in the sample print check screen 1000. That is, the approver affiliation field 1120 and the approver name field 1130 are added to the sample print check screen 1000 illustrated in the example in FIG. 10. An affiliation of a person who checks a sample print result is described in the approver affiliation field 1120 and a name of the person who checks the sample print result is described in the approver name field 1130. These description contents are transmitted, as information of the sample completion 224, to the work flow processor 200, which then manages (registers) this information. FIG. 12 is an explanatory view illustrating an example of display of the sample print check screen 1000. A notification destination field 1210, an approver affiliation field 1120, an approver name field 1130, an approval button 1040, and a cancel button 1050 are displayed in the sample print check screen 1000. That is, the notification destination field 1210 is added to the sample print check screen 1000 illustrated in the example in FIG. 11. An address (which may be, for example, a name or the like) of the print controller 100 at which the sample completion 224 is received is described in the notification destination field 1210. The sample completion 224 is transmitted according to the description contents in the notification destination field 1210. For example, this is used when the sample completion 224 is transmitted to a work flow processor (for a progress administrator) 200B other than a work flow processor (for a printing device administrator) 200A which is transmitting the print job 222.

At Step S924, the print controller 100 notifies the work flow processor 200 of the sample print completion and the changed print parameter. For example, the print parameter table 1300 is transmitted as the print parameter.

At Step S926, the work flow processor 200 registers the sample print completion.

At Step S928, the work flow processor 200 instructs the print controller 100 to release the print job holding.

At Step S930, the print controller 100 starts a real print.

At Step S932, the print controller 100 completes the real print.

At Step S934, the print controller 100 notifies the work flow processor 200 of the real print completion.

At Step S936, the work flow processor 200 registers the real print completion.

Figure 14:
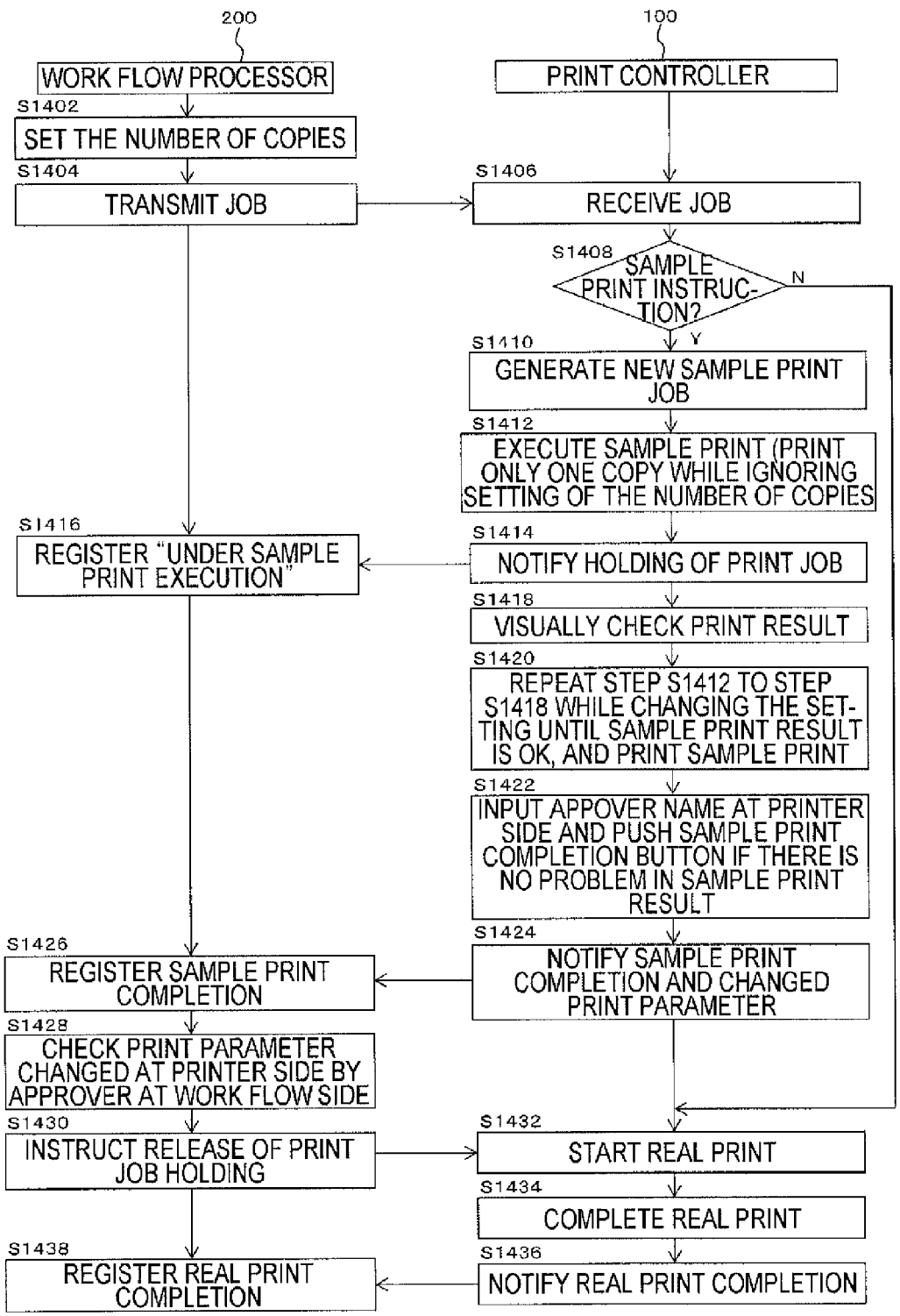
FIG. 14 is a flowchart illustrating an example of another process according to the first exemplary embodiment.

FIG. 14 is a flowchart illustrating an example of another process according to the first exemplary embodiment.

At Step S1402, the work flow processor 200 sets the number of copies in a real print according to an operation of an operator.

At Step S1404, the work flow processor 200 transmits a job to the print controller 100. In addition, an instruction of a sample print is included in this job.

At Step S1406, the print controller 100 receives the job from the work flow processor 200.

At Step S1408, the print controller 100 determines whether or not there is an instruction of the sample print. If there is an instruction of the sample print, the process proceeds to Step S1410. Otherwise, the process proceeds to Step S1432.

At Step S1410, the print controller 100 generates a new sample print job.

At Step S1412, the print controller 100 executes a sample print since the instruction of the sample print is included in the job. Only one copy is printed while ignoring the setting of the number of copies.

At Step S1414, the print controller 100 notifies the work flow processor 200 of the holding of the print job.

At Step S1416, the work flow processor 200 registers "during sample print execution."

At Step S1418, the operator of the print controller 100 visually checks a print result.

At Step S1420, the print controller 100 repeats Step S1412 to Step S1418 while changing the setting until the sample print result is OK, and prints the sample print. The setting may include, for example, change of a scaling factor or the like.

At Step S1422, the print controller 100 lets the operator input a name of a printer side approver and push a sample print completion button when there is no problem in the sample print result. For example, the sample print check screen 1000 illustrated in FIG. 11 or the sample print check screen 1000 illustrated in FIG. 12 is presented.

At Step S1424, the print controller 100 notifies the work flow processor 200 of the sample print completion and the changed print parameter. For example, the print parameter table 1300 is transmitted as the print parameter.

At Step S1426, the work flow processor 200 registers the sample print completion.

At Step S1428, in the work flow processor 200, an approver at the work flow side checks the print parameter changed at the printer side. For example, a print parameter change check screen 1500 is presented. FIG. 15 is an explanatory view illustrating an example of display of the print parameter change check screen 1500. A print parameter change result display area 1510, an approver affiliation field 1530, an approver name field 1540, an approval button 1550, and a cancel button 1560 are displayed in the print parameter change check screen 1500. Then, for example, a message "Sample print has been completed on the printer. Check the changed print parameter. Push the approval button for execution of real print. The real print will start when the approval button is pushed." is displayed in the print parameter change check screen 1500. A print parameter table 1520 is displayed in the print parameter change result display area 1510. The print parameter table 1520 has a setting item field 1522, a content field 1524, a change field 1526, and a cost variation field 1528. The setting item field 1522 displays setting items. The content field 1524 displays contents. The change field 1526 displays the presence or not of change. The cost variation field 1528 displays the presence or not of cost variation. The term "cost" used herein refers to, for example, a raw material cost related to a real print (which may include a sample print) calculated based on the unit price of sheets or the amount of consumption of an image forming material such as a toner. The setting item field 1522 and the content field 1524 correspond to the setting item field 1310 and the content field 1320 of the print parameter table 1300, respectively. The change field 1526 displays a mark in an item changed by the sample print. The cost variation field 1528 shows a cost variation when there is a variation in the marked item. This is because the marked item is a meaningful check item on cost management when the marked item is changed by the sample print. An affiliation of an approver at the work flow side is described in the approver affiliation field 1530, and a name of the approver at the work flow side is described in the approver name field 1540. The work flow processor 200 manages (registers) these information. When the approval button 1550 is pushed, the process proceeds to Step S1430.

Further, from the time point of Step S1404, it may be indicated whether or not there occurred a variation of a cost in the print. Therefore, a cost in Step S1404 may be calculated and recorded, a cost may be again calculated with the print parameter received in Step S1426, and both costs may be compared to determine whether or not there occurred a cost variation. A cost calculation formula is predetermined, and a value in the print parameter table 1300 may be applied to a variable of the cost calculation formula.

At Step S1430, the work flow processor 200 instructs the print controller 100 to release the print job holding.

At Step S1432, the print controller 100 starts a real print.

At Step S1434, the print controller 100 completes the real print.

At Step S1436, the print controller 100 notifies the work flow processor 200 of the real print completion.

At Step S1438, the work flow processor 200 registers the real print completion.

Second Exemplary Embodiment

Figure 16:
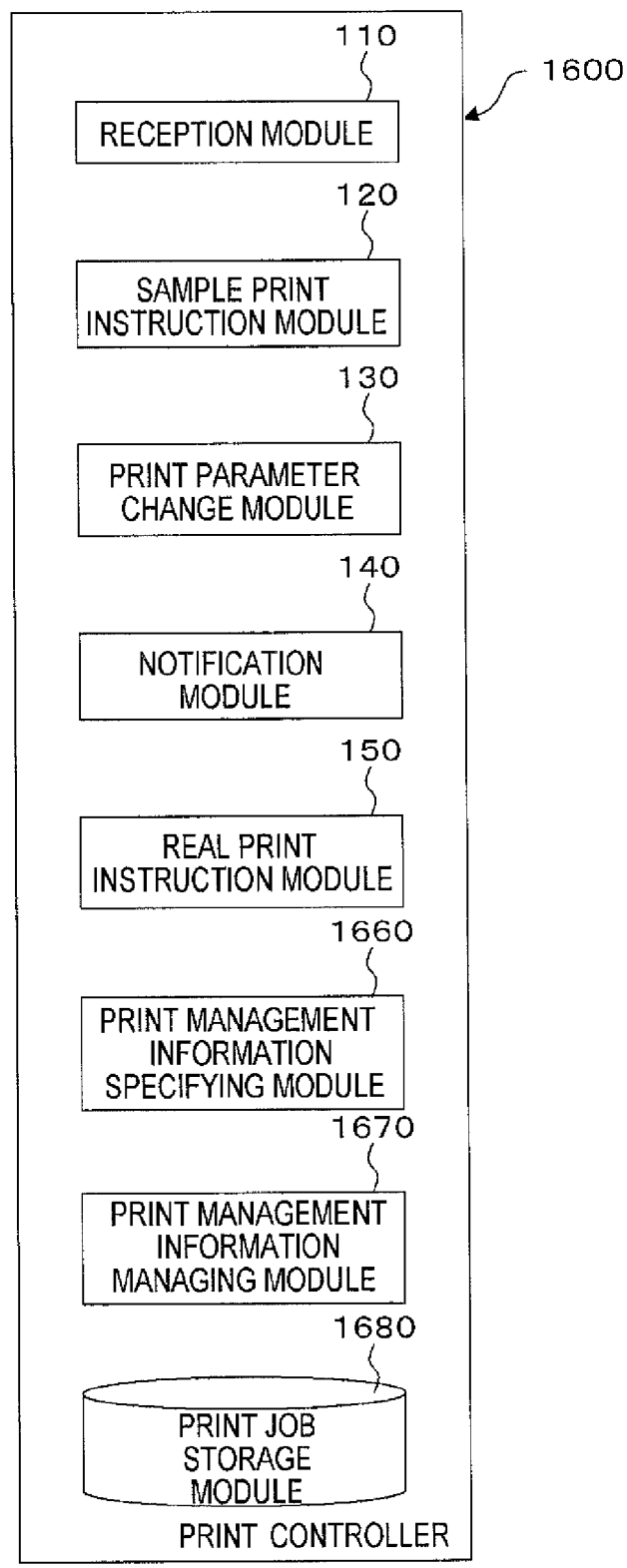
FIG. 16 is a conceptual module configuration view illustrating a configuration example of a second exemplary embodiment.

FIG. 16 is a conceptual module configuration view illustrating a configuration example of a second exemplary embodiment.

As illustrated in the example in FIG. 16, a print controller 1600 includes a reception module 110, a sample print instruction module 120, a print parameter change module 130, a notification module 140, a real print instruction module 150, a print management information specifying module 1660, a print management information managing module 1670, and a print job storage module 1680. In the second exemplary embodiment, the same elements as those of the first exemplary embodiment will be denoted by the same reference numerals as used in the first exemplary embodiment, and overlapping descriptions thereof will be omitted.

The print management information specifying module 1660 matches test print-related information with real print-related information. Therefore, for example, identification information may be used to identify a print job uniquely in this exemplary embodiment. The test print-related information includes at least the number of prints. The real print-related information includes at least the number of prints.

The print management information managing module 1670 unifies the test print-related information and the real print-related information matched by the print management information specifying module 1660.

The print job storage module 1680 stores the test print-related information and the real print-related information or may store the unified information.

The notification module 140 notifies the work flow processor 200 of the test print-related information and the real print-related information unified by the print management information managing module 1670. The unified test print-related information and the real print-related information may be stored in the print job storage module 1680.

Figure 17:
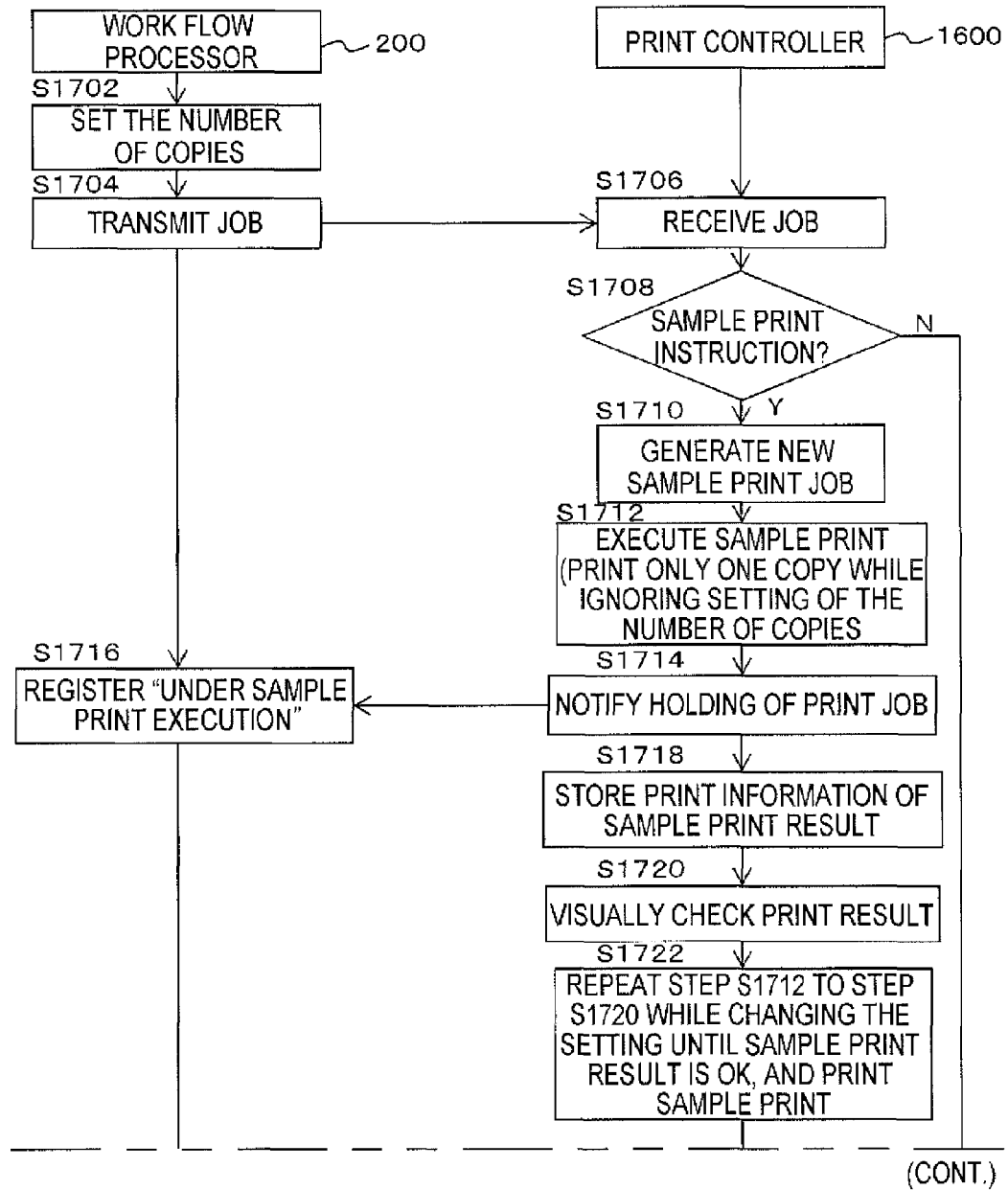
FIG. 17 is a flowchart illustrating an example of a process according to the second exemplary embodiment.

FIG. 17 is a flowchart illustrating an example of a process according to the second exemplary embodiment.

At Step S1702, the work flow processor 200 sets the number of copies in the real print according to an operation of an operator.

At Step S1704, the work flow processor 200 transmits a job to the print controller 1600. In addition, an instruction of a sample print is included in this job.

At Step S1706, the print controller 1600 receives the job from the work flow processor 200.

At Step S1708, the print controller 1600 determines whether or not there is an instruction of a sample print. If there is an instruction of the sample print, the process proceeds to Step S1710. Otherwise, the process proceeds to Step S1734.

At Step S1710, the print controller 1600 generates a new sample print job.

At Step S1712, the print controller 1600 executes a sample print since the instruction of the sample print is included in the job. Only one copy is printed while ignoring the setting of the number of copies.

At Step S1714, the print controller 1600 notifies the work flow processor 200 of the holding of the print job.

At Step S1716, the work flow processor 200 registers "during sample print execution."

At Step S1718, the print controller 1600 stores the print information of the sample print. For example, the print controller 1600 generates a print information table 1800 and stores the table in the print job storage module 1680. FIG. 18A is an explanatory view illustrating an example of a data structure of the print information table 1800. The print information table 1800 has a job ID field 1802, a printing device type field 1804, a sheet size field 1806, a sample print field 1808, a scrap sheet field 1810, a real print field 1812, and a summing field 1814. In this exemplary embodiment, the job ID field 1802 stores information (job ID (Identification)) for identifying a job uniquely. The printing device type field 1804 stores a printing device type. The sheet size field 1806 stores a sheet size. The sample print field 1808 stores the number of prints in the sample print. The scrap sheet field 1810 stores the number of scrap sheets (sheets wasteful in the course of production of print products). The real print field 1812 stores the number of prints in the real print. The summing field 1814 stores the total number of prints (specifically the sum of values in the sample print field 1808, the scrap sheet field 1810, and the real print field 1812). The print information table 1800 is generated every time the sample print is repeated.

At Step S1720, the operator of the print controller 1600 visually checks a print result.

At Step S1722, the print controller 1600 repeats Step S1712 to Step S1720 while changing the setting until the sample print result is OK, and prints the sample print. The setting may include, for example, change of a scaling factor or the like.

At Step S1724, the print controller 1600 lets the operator push a sample print completion button when there is no problem in the sample print result.

At Step S1726, the print controller 1600 aggregates the print information of the sample print. This may be achieved by adding values of the sample print field 1808 and the scrap sheet field 1810 in the print information table 1800 generated in Step S1718.

At Step S1728, the print controller 1600 notifies the work flow processor 200 of the sample print completion and the changed print parameter.

At Step S1730, the work flow processor 200 registers the sample print completion.

At Step S1732, the work flow processor 200 instructs the print controller 1600 to release the print job holding.

At Step S1734, the print controller 1600 starts a real print.

At Step S1736, the print controller 1600 completes the real print.

At Step S1738, the print controller 1600 stores the print information of the real print. For example, the print controller 1600 generates a print information table 1820 and stores the table in the print job storage module 1680. FIG. 18B is an explanatory view illustrating an example of a data structure of the print information table 1820. The print information table 1820 has the same data structure as that of the print information table 1800.

At Step S1740, the print controller 1600 unifies the print information of the sample print and the print information of the real print. For example, the print controller 1600 generates a print information table 1840 and stores the table in the print job storage module 1680. FIG. 18C is an explanatory view illustrating an example of a data structure of the print information table 1840. The print information table 1840 has the same data structure as that of the print information table 1800. The print information table 1840 is obtained by unifying the print information table 1800 and the print information table 1820. Specifically, in the print information table 1840, the print information table 1800 is included in a first row and the print information table 1820 is included in a second row. In addition, print information tables having the same job ID are unified.

At Step S1742, the print controller 1600 notifies the work flow processor 200 of the real print completion. The print information table 1840 is included in this notification.

At Step S1744, the work flow processor 200 registers the real print completion. The work flow processor 200 may also receive the print information table 1840 and manages the number of prints in the sample print and the real print. Thereafter, the number of prints in the sample print and the real print may be handed over to the MIS.

Although the flowchart illustrated in the example in FIG. 17 applies the second exemplary embodiment to the flow chart illustrated in the example in FIG. 8, the second exemplary embodiment may be applied to the flow chart illustrated in the example in FIG. 9 or FIG. 14. Specifically, in the flowchart illustrated in the example in FIG. 9, Step S1718 may be interposed between Step S914 and Step S918, Step S1726 may be interposed between Step S922 and Step S924, and Step S1738 and Step S1740 may be interposed between Step S932 and Step S934. In the flowchart illustrated in the example in FIG. 14, Step S1718 may be interposed between Step S1414 and Step S1418, Step S1726 may be interposed between Step S1422 and Step S1424, and Step S1738 and Step S1740 may be interposed between Step S1434 and Step S1436.

In addition, the print management information specifying module 1660, the print management information managing module 1670, and the print job storage module 1680 may be included in the work flow processor 200 side. In this case, every time a print is completed, the print controller 1600 may notify the work flow processor 200 of print information and may use the print information to generate the print information table 1800 illustrated in the example in FIGS. 18A to 18C.

In addition, as the print parameter table 1300, items other than the items illustrated in the example in FIG. 13 may be added. For example, as a parameter for designating/adjusting the output form of a print image, an image registration parameter, a pagination designation parameter or the like may be included. Then, as a parameter handed over from the sample print setting to the real print setting, only a parameter related to an image quality or other parameters may be included.

Figure 19:
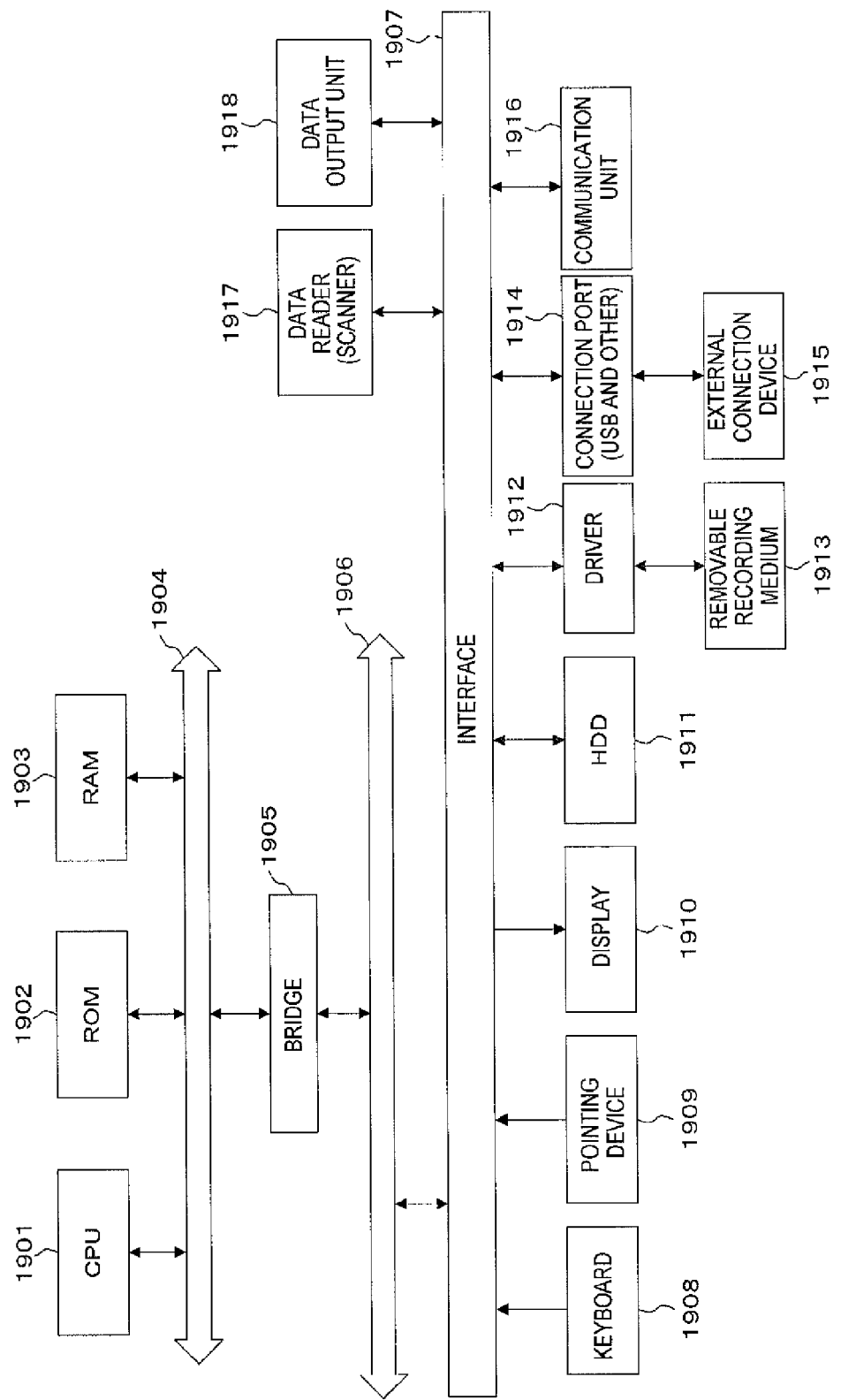
FIG. 19 is a block diagram showing an exemplary hardware configuration of a computer for implementing this exemplary embodiment.

Hereinafter, a hardware configuration example of the print controller according to this exemplary embodiment will be described with reference to FIG. 19. FIG. 19 illustrates an example of a hardware configuration which is configured with, for example, a personal computer (PC) or the like and includes a data reader 1917 such as a scanner and a data output unit 1918 such as a printer.

A CPU (Central Processing Unit) 1901 is a controller that executes a process according to a computer program describing an execution sequence of each of the modules described in the above exemplary embodiments, specifically, the reception module 110, the sample print instruction module 120, the print parameter change module 130, the notification module 140, the real print instruction module 150, the print management information specifying module 1660, the print management information managing module 1670, or the like.

A ROM (Read Only Memory) 1902 stores programs, arithmetic parameters or the like used by the CPU 1901. A RAM (Random Access Memory) 1903 stores programs used in the execution of the CPU 1901, parameters appropriately changed in the execution, or the like. The CPU 1901, the ROM 1902, and the RAM 1903 are interconnected by a host bus 1904 including a CPU bus or the like.

The host bus 1904 is connected to an external bus 1906 such as a peripheral component interconnect/interface (PCI) via a bridge 1905.

A keyboard 1908 and a pointing device 1909 such as a mouse are operated by an operator. A display 1910 may be a liquid crystal display, a cathode ray tube (CRT) or the like and displays various information as text or image information. In addition, a touch screen or the like having both functions of the pointing device 1909 and the display 1910 may be included.

A hard disk drive (HDD) 1911 includes a hard disk (or a flash memory or the like) and drives the hard disk to write or reproduce a program or information to be executed by the CPU 1901. The hard disk implements a function as the print job storage module 1680 or the like. In addition, the hard disk stores other various data (the print parameter table 1300 or the like) and various computer programs or the like.

A driver 1912 reads data or a program recorded in a removable recording medium 1913 such as a magnetic disk, an optical disc, a magnetooptical disc, or a semiconductor memory and supplies the data or the program to the RAM 1903 connected via an interface 1907, the external bus 1906, the bridge 1905, and the host bus 1904. In addition, the removable recording medium 1913 may also be used as a data write area.

A connection port 1914 is connected with an external connection device 1915 and has a connector such as USB or IEEE1394. The connection port 1914 is connected to the CPU 1901 or the like via the interface 1907, the external bus 1906, the bridge 1905, the host bus 1904 or the like. A communication unit 1916 is connected to a communication line and executes a process of data communication with the outside. The data reader 1917 is, for example, a scanner and executes a process of reading a document. The data output unit 1918 is, for example, a printer and executes a process of outputting document data.

In addition, the hardware configuration illustrated in FIG. 19 is a configuration example. The present exemplary embodiment is not limited to the configuration illustrated in FIG. 19, and may have any configuration that is able to execute the modules described in the present exemplary embodiment. For example, some modules may be configured as a dedicated hardware (e.g., an application specific integrated circuit (ASIC) for a specific use or the like), and some modules may be provided within an external system and may be connected through a communication line. In addition, the plural systems illustrated in FIG. 19 may be connected to each other by plural interconnection communication lines to operate in cooperation with each other.

In addition, the above-described programs may be provided by being stored in a recording medium or the programs may be provided by a communication unit. In this case, for example, the above-described program may be construed as an invention of a "computer readable recording medium storing a program."

The "computer readable recording medium storing a program" indicates a computer readable recording medium storing a program, which is useful for installation, execution, distribution and the like of a program.

In addition, the recording medium is, for example, a digital versatile disc (DVD) such as "DVD-R, DVD-RW, and DVD-RAM" which are formats defined in the DVD forum, and "DVD+R and DVD+RW" which are formats defined for DVD+RW, a compact disc (CD) such as a CD read only memory (CD-ROM), a CD recordable (CD-R), and a CD rewritable (CD-RW), a Blu-ray (registered trademark) disc, a magnetooptical (MO) disc, a flexible disc (FD), a magnetic tape, a hard disk, a read-only memory (ROM), an electrically erasable and programmable read-only memory (EEPROM (registered trademark)), a flash memory, a random access memory (RAM), and a secure digital (SD) memory card.

In addition, all or some of the above-described programs may be saved or distributed by being recorded in the recording medium. The programs may be caused to be transmitted by a communication using a transmission medium such as a wired network, a wireless communication network, or a combination thereof used for a local area network (LAN), a metropolitan area network (MAN), a wide area network (WAN), the Internet, the Intranet, the Extranet and others. In addition, the programs may be carried by carrier waves.

Furthermore, the above-described programs may be some or the entirety of other programs, or may be recorded together with separate programs in a recording medium. In addition, the programs may be divided and recorded in plural recording media. In addition, the programs may be recorded in any form, such as compression or encryption, as long as the programs in that form may be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print controller connectable to each of a cut paper printer and a continuous paper printer, the print controller comprising:
a processor programmed to
receive a print job in a job ticket format from a print work flow system,
generate a print job of a new test print based on the received print job and instruct the cut paper printer to execute a print process so as to execute a test print using print data included in the print job when, as a result of interpretation of the print job, the print job includes an effect requiring that the print process according to the print job be executed with the continuous paper printer and an effect requiring that the test print according to the print job be executed,
notify the print work flow system of an effect that the print job is held when the print job of the test print is generated, and
upon receiving from the print work flow system or an operator an instruction of an effect that the holding of the print job is released, send the print data included in the print job and a print parameter changed according to an image quality parameter changed in the print job of the test print to the continuous paper printer and instruct the continuous paper printer to execute a real print job.

2. The print controller according to claim 1, wherein an output reproducibility of the cut paper printer is adjusted to an output reproducibility of the continuous paper printer.

3. The print controller according to claim 2, wherein an output form of the test print includes a reduction mode that executes a reduction process so that an entire layout of one page is recorded on a recording sheet used in the test print.

4. The print controller according to claim 3, wherein when the print job is a variable print, the processor executes a print using one record of the print data included in the print job, as the test print.

5. The print controller according to claim 3, wherein the processor is further programmed to unify test print-related information including at least the number of prints and real print-related information including at least the number of prints and notify the print work flow system of the unified information.

6. The print controller according to claim 2, wherein the processor is further programmed to set a number of output copies according to the print job to 1 as the test print.

7. The print controller according to claim 2, wherein when the print job is a variable print, the processor executes a print using one record of the print data included in the print job, as the test print.

8. The print controller according to claim 2, wherein the processor is further programmed to unify test print-related information including at least the number of prints and real print-related information including at least the number of prints and notify the print work flow system of the unified information.

9. The print controller according to claim 1, wherein an output form of the test print includes a reduction mode that executes a reduction process so that an entire layout of one page is recorded on a recording sheet used in the test print.

10. The print controller according to claim 9, wherein the processor is further programmed to set a number of output copies according to the print job to 1 as the test print.

11. The print controller according to claim 9, wherein when the print job is a variable print, the processor executes a print using one record of the print data included in the print job, as the test print.

12. The print controller according to claim 9, wherein the processor is further programmed to unify test print-related information including at least the number of prints and real print-related information including at least the number of prints and notify the print work flow system of the unified information.

13. The print controller according to claim 1, wherein the processor is further programmed to set a number of output copies according to the print job to 1 as the test print.

14. The print controller according to claim 13, wherein the processor is further programmed to unify test print-related information including at least the number of prints and real print-related information including at least the number of prints and notify the print work flow system of the unified information.

15. The print controller according to claim 1, wherein when the print job is a variable print, the processor executes a print using one record of the print data included in the print job, as the test print.

16. The print controller according to claim 1, wherein the processor is further programmed to unify test print-related information including at least the number of prints and real print-related information including at least the number of prints and notify the print work flow system of the unified information.

17. A print control method for a print controller connectable to each of a cut paper printer and a continuous paper printer, the method comprising:
receiving a print job in a job ticket format from a print work flow system;
generating a print job of a new test print based on the print job received by the receiving unit and instructing the cut paper printer to execute a print process so as to execute a test print using print data included in the print job when, as a result of interpretation of the print job, the print job includes an effect requiring that the print process according to the print job be executed with the continuous paper printer and an effect requiring that the test print according to the print job be executed;
notifying the print work flow system of an effect that the print job is held when the print job of the test print is generated; and
upon receiving from the print work flow system or an operator an instruction of an effect that the holding of the print job is released, sending the print data included in the print job and a print parameter changed according to an image quality parameter changed in the print job of the test print to the continuous paper printer and instructing the continuous paper printer to execute a real print job.

18. A non-transitory computer readable recording medium storing a print control program causing a computer, as a print controller connectable to each of a cut paper printer and a continuous paper printer, to function as:
- a receiving unit that receives a print job in a job ticket format from a print work flow system;
- a test print instruction unit that generates a print job of a new test print based on the print job received by the receiving unit and instructs the cut paper printer to execute a print process so as to execute a test print using print data included in the print job when, as a result of interpretation of the print job, the print job includes an effect requiring that the print process according to the print job be executed with the continuous paper printer and an effect requiring that the test print according to the print job be executed;
- a holding notification unit that notifies the print work flow system of an effect that the print job is held when the print job of the test print is generated; and
- a real print job instruction unit that, upon receiving from the print work flow system or an operator an instruction of an effect that the holding of the print job is released, sends the print data included in the print job and a print parameter changed according to an image quality parameter changed in the print job of the test print to the continuous paper printer and instructs the continuous paper printer to execute a real print job.

* * * * *